United States Patent [19]
Lan et al.

[11] Patent Number: 6,057,396
[45] Date of Patent: *May 2, 2000

[54] INTERCALATES FORMED BY CO-INTERCALATION OF MONOMER, OLIGOMER OR POLYMER INTERCALANTS AND SURFACE MODIFIER INTERCALANTS AND LAYERED MATERIALS AND NONOCOMPOSITES PREPARED WITH THE INTERCALATES

[75] Inventors: Tie Lan, Palatine; Gary W. Beal, McHenry; Semeon Tsipursky, Lincolnwood, all of Ill.

[73] Assignee: AMCOL International Corporation, Arlington Heights, Ill.

[*] Notice: This patent is subject to a terminal disclaimer.

[21] Appl. No.: 08/907,950

[22] Filed: Aug. 11, 1997

Related U.S. Application Data

[63] Continuation-in-part of application No. 08/758,740, Dec. 6, 1996, Pat. No. 5,952,095.

[51] Int. Cl.$^7$ ..................... C08K 3/00
[52] U.S. Cl. ............. 524/445; 524/446; 524/447
[58] Field of Search ................... 524/445, 446, 524/447

[56] References Cited

U.S. PATENT DOCUMENTS

| | | | |
|---|---|---|---|
| 2,035,546 | 3/1936 | Hamilton | 167/24 |
| 3,419,460 | 12/1968 | Ure | 161/162 |
| 3,419,517 | 12/1968 | Hedrick et al. | 260/37 |
| 3,515,626 | 6/1970 | Duffield | 161/162 |
| 3,773,708 | 11/1973 | Takahashi et al. | 260/41 R |
| 3,795,650 | 3/1974 | Burns | 260/33.4 R |
| 3,912,532 | 10/1975 | Simone | 106/308 N |
| 3,929,678 | 12/1975 | Laughlin et al. | 252/526 |
| 4,125,411 | 11/1978 | Lyons | 106/291 |
| 4,210,572 | 7/1980 | Herman et al. | 260/404 |
| 4,251,576 | 2/1981 | Osborn et al. | 428/331 |
| 4,400,485 | 8/1983 | Mukamal et al. | 524/444 |
| 4,431,755 | 2/1984 | Weber et al. | 523/203 |
| 4,434,075 | 2/1984 | Mardis et al. | 252/315.2 |
| 4,472,538 | 9/1984 | Kamigaito et al. | 523/202 |
| 4,500,670 | 2/1985 | McKinley et al. | 524/445 |
| 4,546,145 | 10/1985 | Kishida et al. | 524/780 |
| 4,600,744 | 7/1986 | Libor et al. | 524/446 |
| 4,613,542 | 9/1986 | Alexander | 428/290 |
| 4,624,982 | 11/1986 | Alexander | 524/446 |
| 4,739,007 | 4/1988 | Okada et al. | 524/789 |
| 4,789,403 | 12/1988 | Rice | 106/417 |
| 4,798,766 | 1/1989 | Rice | 428/404 |
| 4,810,734 | 3/1989 | Kawasumi et al. | 523/216 |
| 4,842,651 | 6/1989 | Ravet et al. | 106/487 |
| 4,849,006 | 7/1989 | Knudson, Jr. | 71/64.11 |
| 4,875,762 | 10/1989 | Kato et al. | 350/357 |
| 4,889,885 | 12/1989 | Usuki et al. | 524/443 |
| 4,894,411 | 1/1990 | Okada et al. | 524/710 |
| 4,920,171 | 4/1990 | Hutton, Jr. et al. | 524/446 |
| 4,956,121 | 9/1990 | Tymon et al. | 252/378 R |
| 5,028,351 | 7/1991 | Kato et al. | 252/315.2 |
| 5,032,546 | 7/1991 | Giannelis et al. | 501/3 |
| 5,032,547 | 7/1991 | Giannelis et al. | 501/3 |

(List continued on next page.)

FOREIGN PATENT DOCUMENTS

| | | |
|---|---|---|
| 0 205 281 A3 | 12/1986 | European Pat. Off. . |
| 0 335 653 A1 | 10/1989 | European Pat. Off. . |
| 0 358 415 A1 | 3/1990 | European Pat. Off. . |
| 0 479 031 A1 | 4/1992 | European Pat. Off. . |
| 0 548 940 A1 | 6/1993 | European Pat. Off. . |
| 0 619 182 A1 | 10/1994 | European Pat. Off. . |
| 0 747 451 A2 | 12/1996 | European Pat. Off. . |
| 0 761 739 A1 | 3/1997 | European Pat. Off. . |
| 0 780 340 A1 | 6/1997 | European Pat. Off. . |
| 1 642 122 | 7/1970 | Germany . |
| 281 585 A5 | 8/1990 | Germany . |
| 1 146 668 | 3/1969 | United Kingdom . |
| 1 565 362 | 4/1980 | United Kingdom . |
| 2 088 932 | 6/1982 | United Kingdom . |
| 0 645 181 A2 | 3/1995 | United Kingdom . |
| WO 93/04117 | 3/1993 | WIPO . |
| WO 93/04118 | 3/1993 | WIPO . |
| WO 93/11190 | 6/1993 | WIPO . |

OTHER PUBLICATIONS

C. W. Francis, "Adsorption of Polyvinylpyrrolidone on Reference Clay Minerals", Soil Science, vol. 115, No. 1, 1973, pp. 40–54.

A. Usuki, et al., "Synthesis of nylon 6–clay hybrid", J. Mater. Res., vol. 8, No. 5, May 1993, pp. 1179–1184.

Y. Kojima, et al., "Mechanical Properties of Nylon 6–Clay Hybrid", J. Mater. Res., vol. 8, No. 5, May 1993, pp. 1185–1189.

K. Suzuki, et al., "Preparation Of Delaminated Clay Having A Narrow Micropore Distribution In The Presence Of Hydroxyaluminum Cations And Polyvinyl Alcohol", Clays and Clay Minerals, vol. 36, No. 2, 1988, pp. 147–152.

(List continued on next page.)

*Primary Examiner*—Edward J. Cain
*Attorney, Agent, or Firm*—Marshall, O'Toole, Gerstein, Murray & Borun

[57] ABSTRACT

The present invention discloses intercalates formed by contacting a layered material, e.g., a phyllosilicate, with an intercalant monomer surface modifier including an alkyl radical having at least 6 carbon atoms and a polymerizable monomer, oligomer or polymer. The intercalant monomer surface modifier converts the interlayer region of the layered materials from hydrophilic to hydrophobic, therefore, polymerizable monomers, oligomers or polymers can be easily intercalated into the interlayer spacing. The co-presence of the intercalant monomer surface modifier and polymerizable monomer, oligomer or polymer provide an environment for more polymerizable monomers, oligomers or polymers to be intercalated into the interlayer spacing and the intercalates are readily exfoliated into polymer matrices to form nanocomposites. The nanocomposites (e.g., epoxy-clay) prepared from the intercalates demonstrated enhanced mechanical, thermal and chemical resistance compared with pristine polymer matrices.

47 Claims, 16 Drawing Sheets

U.S. PATENT DOCUMENTS

| | | | |
|---|---|---|---|
| 5,091,462 | 2/1992 | Fukui et al. | 524/504 |
| 5,102,948 | 4/1992 | Deguchi et al. | 524/789 |
| 5,164,440 | 11/1992 | Deguchi et al. | 524/444 |
| 5,164,460 | 11/1992 | Yano et al. | 624/445 |
| 5,204,078 | 4/1993 | Tateyama et al. | 423/331 |
| 5,206,284 | 4/1993 | Fukui et al. | 524/504 |
| 5,229,451 | 7/1993 | Carter et al. | 524/493 |
| 5,248,720 | 9/1993 | Deguchi et al. | 524/444 |
| 5,326,500 | 7/1994 | Friedman et al. | 252/378 |
| 5,340,558 | 8/1994 | Friedman et al. | 423/328.1 |
| 5,385,776 | 1/1995 | Maxfield et al. | 428/297 |
| 5,391,437 | 2/1995 | Miyasaka et al. | 528/425.5 |
| 5,414,042 | 5/1995 | Yasue et al. | 524/789 |
| 5,428,094 | 6/1995 | Tokoh et al. | 524/379 |
| 5,506,046 | 4/1996 | Andersen et al. | 524/446 |
| 5,508,072 | 4/1996 | Andersen et al. | 524/446 |
| 5,514,734 | 5/1996 | Maxfield et al. | 523/204 |
| 5,552,469 | 9/1996 | Beall et al. | 524/445 |
| 5,554,670 | 9/1996 | Giannelis | 523/209 |
| 5,578,672 | 11/1996 | Beall et al. | 524/446 |
| 5,667,886 | 9/1997 | Gough et al. | 428/331 |
| 5,760,106 | 6/1998 | Pinnavaia et al. | 523/209 |
| 5,880,197 | 3/1999 | Beall et al. | 524/445 |

OTHER PUBLICATIONS

R. Levy, et al., "Interlayer Adsorption of Polyvinylpyrrolidone On Montmorillonite", Journal of Colloid and Interface Science, vol. 50, No. 3, Mar. 1975, pp. 442–450.

D.J. Greenland, "Adsorption Of Polyvinyl Alcohols By Montmorillonite", Journal of Colloid Science, 18, (1963) pp. 647–664.

R.A. Vaia, et al., "Synthesis and Properties of Two–Dimensional Nanostructures by Direct Intercalation of Polymer Melts in Layered Silicates", Chem. Mater. 1993, 5, pp. 1694–1696.

R.A. Vaia, et al., "New Polymer Electrolyte Nanocomposites: Melt Intercalation of Poly(ethylene oxide) in Mica–Type Silicates", Advanced Materials 1995, 7, No. 2, pp. 154–156.

A. Akelah, et al., "Synthesis and Characterization of Epoxyphilic montmorillonites", Clay Minerals (1994) 29, pp. 169–178.

C.E. Clapp, et al., "Adsorption Studies Of A Dextran On Montmorillonite", Trans. 9th Int. Cong. Soil Sci., 1968, vol. 1, pp. 627–634.

H.G.G. Dekking, "Preparation And Properties Of Some Polymer–Clay Compounds", Clays and Clay Minerals, 1964, 12, pp. 603–616.

A. Usuki, et al., "Characterization and Properties of Nylon 6—Clay Hybrid", (source and date unknown), pp. 651–652.

G.W. Brindley, et al., "Preparation And Solvatio Properties Of Some Variable Charge Montmorillonites", Clays and Clay Minerals, 1971, vol. 18, pp. 399–404.

A. Okada, et al., "A Solid State NMR Study On Crystalline Forms Of Nylon 6", Journal of Applied Polymer Science, (1989), vol. 37, pp. 1363–1371.

A. Usuki, et al., Swelling Behavior Of Montmorillonite Cation Exchanged For ω–Amino Acids By ε–Caprolactam, J. Mater. Res., vol. 8, No. 5, May 1993, pp. 1174–1178.

Y. Kojima, et al., "Fine Structure Of Nylon–6–Clay Hybrid", Journal of Polymer Science: Part B: Polymer Physics, vol. 32 (1994), pp. 625–630.

B.K.G. Theng, "Clay–Polymer interactions: Sumary And Perspectives", Clays and Clay Minerals, vol. 30, No. 1 (1982) pp. 1–9.

Sugahara, et al., "Clay–Organic Nano–Composite; Preparation of a Kaolinite–Poly(vinylpyrrolidone) Intercalation Compound", Journal of the Ceramic Society of Japan, International Edition, vol. 100, No. 4, Apr. 1, 1992, pp. 420–423.

Ogawa, et al., "Preparation Of Montmorillonite–Polyacrylamide Intercalation Compounds And The Water Absorbing Property", Clay Science, vol. 7, 1989 Tokyo, Japan, pp. 243–251.

Y. Kojima, et al., "One–Pot Synthesis of Nylon 6–Clay Hybrid", Journal of Polymer Science: Part A: Polymer Chemistry, vol. 31, (1993), pp. 1755–1758.

Wu, et al., "Structural, thermal, and electrical characterization of layered nanocomposites derived from sodium–montmorillonite and polyethers", Chemical Abstracts, vol. 119, No. 4, Jul. 26, 1993 Columbus, Ohio, US, Abstract No. 31017r.

Bujdak, et al., "The reaction of montmorillonite with octadecylamine in solid and melted state", Chemical Abstracts, vol. 118, No. 26, Abstract No. 257609b, p. 166 (Jun. 28, 1993), Columbus, Ohio (US).

Yano, et al., "Synthesis And Properties Of Polyimide–Clay Hybrid", Polymer Preprints, ACS, Apr. 1991, pp. 65–66.

Giannelis, et al., "Synthesis And Processing Of Ceramics: Scientific Issues", Materials Research Society Symposium Proceedings, vol. 249 (1992), pp. 547–558.

Sanchez Camazano, M. et al., "Factors influencing interactions of organophosphorus pesticides with montmorillonite", Chemical Abstracts, vol. 98, No. 19, May 9, 1983, Columbus, Ohio, US, Abstract No. 156367.

T. Lan, et al., "Clay–Epoxy Nanocomposites:Relationships Between Reinforcement Properties And The Extent Of Clay Layer Exfoliation", Polym. Mater. Sc. Eng., 73, pp. 296–297 (1995).

FIG. 1   ⊖Na ⊖Mg ◯Al ◯X◯ ⊘Si
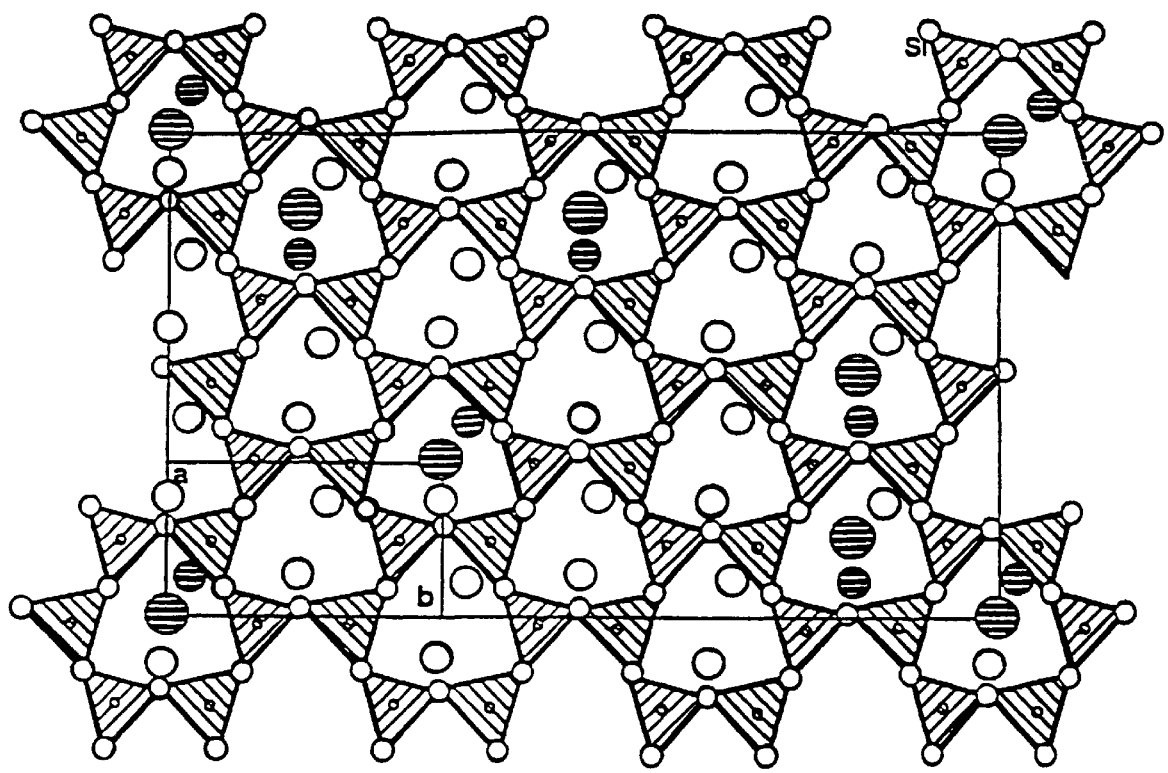
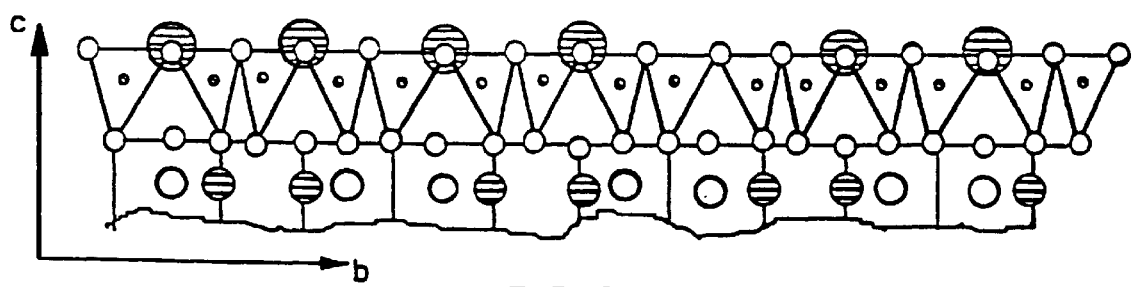
FIG. 2
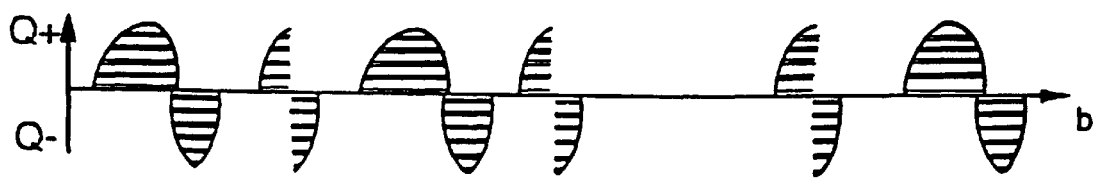
FIG. 3

INTERCALATES FORMED BY CO-INTERCALATION OF MONOMER, OLIGOMER OR POLYMER INTERCALANTS AND SURFACE MODIFIER INTERCALANTS AND LAYERED MATERIALS AND NONOCOMPOSITES PREPARED WITH THE INTERCALATES

CROSS REFERENCE TO RELATED APPLICATION

This application is a continuation-in-part of U.S. application Ser. No. 08/758,740 filed Dec. 6, 1996, U.S. Pat. No. 5,952,095.

FIELD OF THE INVENTION

The present invention is directed to intercalated layered materials and exfoliates thereof, prepared by co-intercalation of polymerizable monomers, polymerizable oligomers or polymers and one or more long chain ($C_6$+) monomeric organic molecules (surface modifiers) between the planar layers of a swellable layered material, such as a phyllosilicate, preferably a smectite clay. The spacing of adjacent layers of the layered materials was expanded at least about 10 Å, preferably at least about 20 Å. The long chain ($C_6$+) monomeric organic molecules (surface modifiers) in this invention have at least one binding site to $Li^+$, $Na^+$, $K^+$, $Ca^{+2}$ $Mg^{+2}$, or other inorganic cations that occur within the interlayer spaces between adjacent layers or platelets of the layered materials being intercalated. The association of the layered material inorganic cations with the surface modifier enables the conversion of the hydrophilic interior clay platelet surfaces to hydrophobic platelet surfaces, therefore, polymerizable monomer or polymerizable oligomer resin molecules, such as epoxy resin monomers and/or oligomers, could be intercalated between the clay platelets. Similarly, the fully polymerized polymer also can be intercalated between adjacent platelets of the layered material. The co-intercalation of the surface modifier and the polymerizable monomers, polymerizable oligomers or polymers simultaneously eliminates a separate intercalation step for the surface modifier-layered material intercalate and reduces the amount of surface modifier needed to change the hydrophilic clay surface to hydrophobic. In general, the minimum molar ratio of the surface modifier to the interlayer inorganic cations to convert the surface from hydrophilic to hydrophobic is 1:1. However, most of the internal space of clay will be occupied by the surface modifier at such a molar ratio. The intercalates in this invention preferably are prepared by co-intercalation of surface modifier and the polymerizable monomer/oligomer or polymer into the clay interlayer space simultaneously. The molar ratio of the surface modifier to the inorganic cations, therefore, can be reduced to a substantially lower level, e.g., in the range of from 1:1 to about 1:5. The lowered amount of surface modifier increases the loading of the intercalated monomer, oligomer, or polymer, e.g., epoxy resin, to about 30–70 weight percent, preferably 40–50 weight percent, based on the total weight of the surface modifier and polymerizable monomer/oligomer and/or polymer intercalated. The intercalates can be in a powdered solid, waxy solid, or gel state depending on the nature of the polymerizable monomer/oligomer or polymer and depending on the monomer/oligomer/polymer to layered compound ratio.

The intercalates of the present invention can be dispersed uniformly into any desired monomers, oligomers, and/or polymer matrix or host materials to form exfoliated polymer-clay nanocomposites. In particular, for the thermoset resins, the intercalates can be dispersed in a monomer set and cured with curing agents. Also, curing agents can be directly incorporated into the intercalate and cured together with the polymerization of an intercalant monomer in situ, which has been intercalated into the clay interlayer galleries. In particular, for thermoplastic resins, if an intercalant polymer is intercalated into the clay galleries, the intercalate can be directly compounded with the pristine matrix polymer to form a nanocomposite. If a monomer or oligomer intercalant is intercalated into the clay galleries, the intercalant can be polymerized together with a desired monomer, oligomer or polymer matrix material, and the combination then can be compounded to form the nanocomposite.

BACKGROUND OF THE INVENTION AND PRIOR ART

It is well known that phyllosilicates, such as smectite clays, e.g., sodium montmorillonite and calcium montmorillonite, can be treated with organic molecules, such as organic ammonium ions, to intercalate the organic molecules between adjacent, planar silicate layers, for bonding the organic molecules with a polymer, for intercalation of the polymer between the layers, thereby substantially increasing the interlayer (interlaminar) spacing between the adjacent silicate layers. The thus-treated, intercalated phyllosilicates, having interlayer spacings of at least about 10–20 Å and up to about 100 Angstroms, then can be exfoliated, e.g., the silicate layers are separated, e.g., mechanically, by high shear mixing. The individual silicate layers, when admixed with a matrix polymer, before, after or during the polymerization of the matrix polymer, e.g., a polyamide—see U.S. Pat. No. 4,739,007; 4,810,734; and 5,385,776—have been found to substantially improve one or more properties of the polymer, such as mechanical strength and/or high temperature characteristics.

Exemplary prior art composites, also called "nanocomposites", are disclosed in published PCT disclosure of Allied Signal, Inc. WO 93/04118 and U.S. Pat. No. 5,385,776, disclosing the admixture of individual platelet particles derived from intercalated layered silicate materials, with a polymer to form a polymer matrix having one or more properties of the matrix polymer improved by the addition of the exfoliated intercalate. As disclosed in WO 93/04118, the intercalate is formed (the interlayer spacing between adjacent silicate platelets is increased) by adsorption of a silane coupling agent or an onium cation, such as a quaternary ammonium compound, having a reactive group which is compatible with the matrix polymer. Such quaternary ammonium cations are well known to convert a highly hydrophilic clay, such as sodium or calcium montmorillonite, into an organophilic clay capable of sorbing organic molecules. A publication that discloses direct intercalation (without solvent) of polystyrene and poly (ethylene oxide) in organically modified silicates is *Synthesis and Properties of Two-Dimensional Nanostructures by Direct Intercalation of Polymer Melts in Layered Silicates*, Richard A. Vaia, et al., *Chem. Mater.*, 5:1694–1696(1993). Also as disclosed in *Adv. Materials*, 7, No. 2: (1985), pp, 154–156, *New Polymer Electrolyte Nanocomposites: Melt Intercalation of Poly(Ethylene Oxide) in Mica-Type Silicates*, Richard A. Vaia, et al., poly(ethylene oxide) can be intercalated directly into Na-montmorillonite and Li-montmorillonite by heating to 80° C. for 2–6 hours to achieve a d-spacing of 17.7 Å. The intercalation is accompanied by displacing water molecules, disposed between the clay platelets, with polymer molecules. Apparently, however, the intercalated material could not be exfoliated and was tested in pellet form. It was quite surprising to one of the authors of these articles that exfoliated material could be manufactured in accordance with the present invention.

Previous attempts have been made to intercalate polyvinylpyrrolidone (PVP), polyvinyl alcohol (PVA) and poly (ethylene oxide) (PEO) between montmorillonite clay platelets with little success. As described in Levy, et al., *Interlayer Adsorption of Polyvinylpyrrolidone on Montmorillonite*, Journal of Colloid and Interface Science, Vol. 50, No. 3, March 1975, pages 442–450, attempts were made to sorb PVP (40,000 average M.W.) between monoionic montmorillonite clay platelets (Na, K, Ca and Mg) by successive washes with absolute ethanol, and then attempting to sorb the PVP by contact with 1% PVP/ethanol/water solutions, with varying amounts of water, via replacing the ethanol solvent molecules that were sorbed in washing (to expand the platelets to about 17.7 Å). Only the sodium montmorillonite had expanded beyond a 20 Å basal spacing (e.g., 26 Å and 32 Å), at $5^+$% $H_2O$, after contact with the PVP/ethanol/$H_2O$ solution. It was concluded that the ethanol was needed to initially increase the basal spacing for later sorption of PVP, and that water did not directly affect the sorption of PVP between the clay platelets (Table II, page 445), except for sodium montmorillonite. The sorption was time consuming and difficult and met with little success.

Further, as described in Greenland, *Adsorption of Polyvinyl Alcohols by Montmorillonite*, Journal of Colloid Sciences, Vol. 18, pages 647–664 (1963), polyvinyl alcohols containing 12% residual acetyl groups could increase the basal spacing by only about 10 Å due to the sorbed polyvinyl alcohol (PVA). As the concentration of polymer in the intercalant polymer-containing solution was increased from 0.25% to 4%, the amount of polymer sorbed was substantially reduced, indicating that sorption might only be effective at polymer concentrations in the intercalant polymer-containing composition on the order of 1% by weight polymer, or less. Such a dilute process for intercalation of polymer into layered materials would be exceptionally costly in drying the intercalated layered materials for separation of intercalate from the polymer carrier, e.g., water, and, therefore, apparently no further work was accomplished toward commercialization.

In accordance with one embodiment of the present invention, intercalates are prepared by contacting a phyllosilicate with a monomeric organic compound having a long chain alkyl radical ($C_6$+alkyl). Exemplary of such suitable $C_6$+ organic molecules include organic molecules that have an alkyl radical with a chain length of at least 6 carbon atoms, as well as a polar functionality, such as a hydroxyl; a polyhydroxyl; a carbonyl, such as carboxylic acids, and salts thereof; polycarboxylic acids and salts thereof; aldehydes; ketones; amines; amides; ethers; esters; lactams; lactones; anhydrides; nitriles; n-alkyl halides; pyridines; and mixtures thereof.

In accordance with an important feature of the present invention, best results are achieved by mixing the layered material with such a polar monomeric organic intercalant surface modifier compound, having a $C_6$+ alkyl group, in a concentration of at least about 2%, preferably at least about 5% by weight surface modifier compound, more preferably at least about 10% by weight long chain alkyl monomeric organic intercalant surface modifier compound, and most preferably about 30% to about 80% by weight, based on the weight of long chain alkyl monomeric organic intercalant compound and carrier (e.g., water, with or without an organic solvent for the polar, long chain alkyl monomeric surface modifier compound) to achieve better sorption of the monomeric organic intercalant surface modifier compound between the platelets of the layered material. Regardless of the concentration of monomeric organic intercalant surface modifier compound, the intercalating composition should have a long chain monomeric organic intercalant surface modifier compound:layered material weight ratio of at least 1:20, preferably at least 1:10, more preferably at least 1:5, and most preferably about 1:4 to achieve electrostatic complexing of the polar functionality of the monomeric organic intercalant surface modifier compound with an inner surface of a platelet of the layered material to achieve efficient intercalation of the monomeric organic intercalant surface modifier compound and polymerizable monomer/oligomer or polymer intercalant between adjacent platelets of the layered material. The long chain ($C_6$+ alkyl) monomeric organic intercalant surface modifier compound sorbed between and bonded to (complexed with) the silicate platelets causes surprising separation or added spacing between adjacent silicate platelets for easy intercalation of the polymerizable monomer/oligomer or polymer intercalant, e.g., epoxy resin.

In accordance with the present invention, it has been found that a phyllosilicate, such as a smectite clay, can be intercalated sufficiently for subsequent exfoliation by sorption of $C_6$+ organic surface modifier compounds, to provide bonding between the polar end of one or two intercalant surface modifier molecules and the $Na^+$ cations of the inner surfaces of the platelets of the layered material, e.g., phyllosilicate. Sorption and metal cation attraction or bonding between one or two end groups of the monomeric intercalant surface modifier molecules and the interlayer $Na^+$ cations of the phyllosilicate is provided by a mechanism selected from the group consisting of ionic complexing; electrostatic complexing; chelation; hydrogen bonding; ion-dipole; dipole/dipole; Van Der Waals forces; and any combination thereof.

Such bonding, via one or more metal ($Na^+$) cations of the phyllosilicate sharing electrons with one or two atoms of one or two polar ends of $C_6$+ alkyl monomer intercalant surface modifier molecules, on an inner surface of each adjacent phyllosilicate platelet surfaces surprisingly provides rigid intercalant monomer molecules extending perpendicularly from the phyllosilicate platelet surfaces, and increases the interlayer spacing between adjacent silicate platelets or other layered material at least about 10 Å, preferably at least about 20 Å, more preferably to at least about 30 Å, and most preferably in the range of about 30 Å to about 45 Å, while consuming surprisingly little monomer intercalant surface modifier in relation to the increased basal spacing achieved, thereby allowing sufficient interlayer space and sufficient free platelet metal cations ($Na^+$) for intercalation of a substantial quantity of polymerizable monomer/oligomer molecules, and/or polymer molecules, e.g., epoxy resin molecules.

The intercalates and/or exfoliates thereof can be admixed with a polymer or other organic monomer compound(s) or composition to increase the viscosity of the organic compound or provide a polymer/intercalate and/or polymer/exfoliate composition to enhance one or more properties of a matrix polymer, such as an epoxy resin.

One method of preparing layered silicate-epoxy nanocomposites is disclosed by Giannelis in U.S. Pat. No. 5,554,670. In accordance with the method disclosed in the Giannelis '670 patent, a smectite-type clay is first contacted with an organic compound containing alkylammonium ions having functional groups which are reactive to epoxy resin molecules. The clay layers were attached directly to the polymer network by ion-exchange and molecularly dispersed in the matrix. The nanocomposites disclosed in the '670 patent exhibit a slightly increased glass transition temperature. The dynamic storage modulus of the nanocomposite was considerably higher in the glassy region and very higher in the rubbery region when compared with such modulus in the pristine matrix.

The intercalates of the present invention do not require the expensive functionalized onium ion (alkylammonium ions) or silane coupling agents and eliminate the complicated ion exchange process. In the present invention, monomer, oligomer and/or polymer can be easily co-intercalated into the clay galleries with the assistance of the $C_6+$ surface modifier since the surface modifier provides a strong affinity for intercalants. In principle, epoxy resin and surface modifier perform together in the gallery of the layered materials to make the inorganic layered materials compatible with the epoxy matrix and form the nanocomposite. The process of the present invention can be applied to all market available resin systems, particularly epoxy resins such as: Bisphenol A-derived resins, Epoxy cresol Novolac resins, Epoxy phenol Novolac resins, Bisphenol F resins, polynuclear phenol-glycidyl ether-derived resins, cycloaliphatic epoxy resins, aromatic and heterocyclic glycidyl amine resins, tetraglycidylmethylenedianiline-derived resins.

DEFINITIONS

Whenever used in this Specification, the terms set forth shall have the following meanings:

"Layered Material" shall mean an inorganic material, such as a smectite clay mineral, that is in the form of a plurality of adjacent, bound layers and has a thickness, for each layer, of about 3 Å to about 50 Å, preferably about 10 Å.

"Platelets" shall mean individual layers of the Layered Material.

"Intercalate" or "Intercalated" shall mean a Layered Material that includes long chain alkyl ($C_6+$ alkyl) monomeric organic surface modifier molecules disposed between adjacent platelets of the Layered Material to increase the interlayer spacing between the adjacent platelets at least about 10 Å, preferably at least about 20 Å.

"Intercalation" shall mean a process for forming an Intercalate.

"Surface modifier" shall mean a monomeric organic compound that includes a long chain alkyl ($C_6+$) group and at least one functional group which is capable of electrostatically binding to inorganic cations, such as $Li^+$, $Na^+$, $K^+$, $Ca^{+2}$, and $Mg^{+2}$ via a polar moiety that provides the molecule with a dipole moment that is greater than the dipole moment of water. Suitable polar moieties include, for example, a moiety selected from the group consisting of a hydroxyl; a polyhydroxyl; a carbonyl; a carboxylic acid; an amine; an amide; an ether; an ester; lactams; lactones; anhydrides; nitrites; n-alkyl halides; pyridines; and mixtures thereof that is sorbed between Platelets of the Layered Material and complexes with the $Na^+$ cations on the platelet surfaces to form an Intercalate.

"Epoxy resin" shall mean an epoxy polymer, or a monomer or prepolymer (oligomer) that can react with curing agents to yield network thermosetting epoxy polymers. The polymer, monomer or prepolymer (oligomer) shall have at least one three-membered cyclic ether group commonly referred to as an epoxy group, 1,2-epoxide or oxirane.

"Co-intercalation" shall mean a process for forming an intercalate by intercalation of a $C_6+$ monomeric surface modifier molecule and a polymerizable monomer or oligomer or polymer, such as an epoxy resin.

"Concentrate" shall mean an intercalate containing layered inorganic materials, surface modifier and a polymerizable monomer or oligomer, or a polymer, such as an epoxy resin.

"Intercalating Carrier" shall mean a carrier comprising water with or without an organic solvent used together with the Surface Modifier and Intercalant monomer/oligomer or polymer to form an Intercalating Composition capable of achieving Intercalation of the Layered Material.

"Intercalating Composition" or "Intercalant Composition" shall mean a composition comprising a Surface Modifier, an Intercalant monomer/oligomer or polymer, an Intercalating Carrier for the Intercalant monomer/oligomer or polymer, and a Layered Material.

"Exfoliate" or "Exfoliated" shall mean individual platelets of an Intercalated Layered Material capable of being dispersed individually throughout a carrier material, such as water, a polymer, an alcohol or glycol, or any other organic solvent, or throughout a matrix polymer.

"Exfoliation" shall mean a process for forming an Exfoliate from an Intercalate.

"Matrix Polymer" shall mean a thermoplastic or thermosetting polymer that the Intercalate or Exfoliate is dispersed within to improve the mechanical strength or thermal resistance of the Matrix Polymer.

SUMMARY OF THE INVENTION

In brief, the present invention is directed to intercalated layered materials prepared by co-intercalation of polymerizable monomers or oligomers or polymers, e.g., epoxy resins, and long chain ($C_6+$) monomeric organic molecules (surface modifiers) between the planar layers of a swellable layered material, such as a phyllosilicate, preferably a smectite clay. The spacing of adjacent layers of the layered materials is expanded at least about 10 Å, preferably at least about 20 Å. The long chain ($C_6+$) monomeric organic molecules (surface modifier) in this invention have at least one polar binding site to $Li^+$, $Na^+$, $K^+$, $Ca^{+2}$ $Mg^{+2}$, or other inorganic cations that are naturally disposed in the interlayer space between adjacent platelets or layers of the swellable layered materials. The binding between the surface modifier and the intergallery inorganic cations eliminates the presence of water molecules associated with the inorganic cations. Therefore, the electrostatic association of the intergallery inorganic cations with the long chain ($C_6+$) surface modifier enables the conversion of the hydrophilic interior clay surface to hydrophobic and, therefore, hydrophobic polymerizable resin monomer or oligomer molecules and hydrophobic polymer molecules can be intercalated into the clay galleries.

Suitable surface modifier molecules include a long chain ($C_6+$) alkyl group and at least one polar functionality such as: hydroxyl, carbonyl, carboxylic acid, amine, amide, ester, ether, lactam, lactone, anhydride, nitrile, oxirane, halide, pyridine, polyethylene oxide, polypropylene oxide, and the like. The polymerizable monomer/oligomer or polymer intercalant molecules should be relatively unreactive to the intercalating carrier, such as water.

The present invention is directed to the method of preparing intercalated layered materials prepared by co-intercalation of polymerizable monomers or oligomers or polymers, such as epoxy resins and/or one or more epoxy resin monomer, e.g., a polyhydric alcohol, and long chain ($C_6+$) monomeric organic molecules (surface modifiers) between the planar layers of a swellable layered material, such as a phyllosilicate, preferably a smectite clay. With the assistance of the intercalating carrier, the polymerizable monomer or oligomer or polymer molecules and surface modifier will co-intercalate into the galleries of the layered materials to form intercalates or intercalate concentrate compositions capable of easy exfoliation.

The present invention also is directed to the exfoliate which is prepared from the intercalate or intercalate concentrate compositions. The exfoliate can be prepared by diluting the concentrate in more polymerizable monomer/oligomer, or adding the polymer, e.g., polymerized epoxy resins, and then curing. The presence of polymerizable monomer or oligomer in the galleries of the layered materials makes the layered materials compatible to the parent matrix polymer, when the intercalate is added to additional matrix polymer that is the same as the monomer or oligomer intercalated. Therefore, for example, when mixed with more epoxy, the layered materials are ready to be dispersed or exfoliated in the resin. When a polymer curing agent is added, the layered materials will be exfoliated by virtue of the expanding, polymerizing monomer and polymer molecules dispersed between platelet layers. The exfoliated individual layers of the layered materials will perform as a polymer reinforcement and molecule (gas) barrier in the resin to improve the mechanical properties and barrier properties, e.g., gas impermeability. The exfoliate also can be prepared by directly adding a curing agent to the intercalated concentrate. The curing agent will penetrate into the gallery region of the intercalate to react with the polymerizable monomers, oligomers or polymers previously intercalated in the interlayer gallery and form uniformly dispersed platelets in the resulting nanocomposite, having a high solids content.

The long chain ($C_6+$) intercalant monomer surface modifier molecules have an affinity for the $Na^+$ cations on the inner surfaces of the phyllosilicate platelets so that the surface modifier is sorbed between, and is maintained associated with the silicate platelets in the interlayer spaces, and is complexed to the platelet surfaces after exfoliation. The surface modifier molecules are sufficiently bound to the phyllosilicate platelet surface, it is hereby theorized, by a mechanism selected from the group consisting of ionic complexing; electrostatic complexing; chelation; hydrogen bonding; ion-dipole; dipole/dipole; Van Der Waals forces; and any combination thereof. Such bonding, via a metal cation, e.g., $Na^+$, of the phyllosilicate inner platelet surface sharing electrons with electronegative atoms of the long chain, monomeric organic intercalant surface modifier compound, provides adherence between the intercalant monomer surface modifier molecules and the platelet inner surfaces of the layered material.

Such intercalant monomer surface modifiers have sufficient affinity for the phyllosilicate platelets to maintain sufficient interlayer spacing for exfoliation, without the need for coupling agents or spacing agents, such as the onium ion or silane coupling agents disclosed in the above-mentioned prior art. Consequently, in accordance with the present invention, the phyllosilicate inner platelet surfaces need not be first reacted or ion-exchanged with an onium ion or silane coupling agent in order to complex the intercalant monomer surface modifiers to the inner platelet surfaces together with intercalation of one or more polymerizable monomers/oligomers or polymers. A schematic representation of the charge distribution on the surfaces of a sodium montmorillonite clay is shown in FIGS. 1–3. As shown in FIGS. 2 and 3, the location of surface $Na^+$ cations with respect to the location of oxygen (Ox), Mg, Si and Al atoms (FIGS. 1 and 2) results in a clay surface charge distribution as schematically shown in FIG. 3. The positive-negative charge distribution over the entire clay surface provides for excellent dipole/dipole attraction of the above-described long chain, organic monomer intercalant surface modifiers on the surfaces of the clay platelets to expand the interlayer spacing sufficiently for easy intercalation of one or more polymerizable monomers/oligomers or polymers.

The intercalate-containing and/or exfoliate-containing compositions can be in the form of a stable thixotropic gel that is not subject to phase separation and can be used to deliver any active materials, such as in the cosmetic, hair care and pharmaceutical industries. The layered material is intercalated and optionally exfoliated by contact with an intercalant monomer and water, such as by mixing and/or extruding the intercalant composition to intercalate the monomer surface modifier between adjacent phyllosilicate platelets and optionally separate (exfoliate) the layered material into individual platelets. The amount of water varies, depending upon the amount of shear imparted to the layered material in contact with the intercalant monomer and water. In one method, the intercalating composition is pug milled or extruded at a water content of about 25% by weight to about 50% by weight water, preferably about 35% to about 40% by weight water, based on the dry weight of the layered material, e.g., clay. In another method, the clay and water are slurried, with at least about 25% by weight water, preferably at least about 65% by weight water, based on the dry weight of the layered material, e.g., preferably less than about 20% by weight clay in water, based on the total weight of layered material and water, more preferably less than about 10% layered material in water, with the addition of about 2% by weight to about 90% by weight intercalant monomer, based on the dry weight of the layered material.

Sorption of the intercalant monomer surface modifier should be sufficient to achieve expansion of the interlayer spacing of adjacent platelets of the layered material (when measured dry) at least about 10 Å, preferably at least about 20 Å, more preferably at least about 30 Å, and most preferably to achieve a spacing of about 30–45 Å. To achieve intercalates that can be exfoliated easily using the monomer intercalant surface modifiers disclosed herein, the molar ratio of intercalant monomer surface modifier to interlayer cations of the layered material, preferably a water-swellable smectite clay such as sodium bentonite, in the intercalating composition should be at least about 1:5, preferably about 1:1 to 1:5. The co-intercalation of surface modifier and monomer, oligomer or polymer intercalant into the clay interlayer spacing can be achieved by intercalation of the intercalant after intercalation of the surface modifier; or by simultaneous intercalation of surface modifier and intercalant from an emulsion-like liquid mixture at ambient or elevated temperatures.

Interlayer spacings sufficient for exfoliation are achieved by direct intercalation of the above-defined intercalant monomer surface modifiers, without prior sorption of an onium ion or silane coupling agent, and provide easier and more complete exfoliation for or during incorporation of the platelets into a polar organic compound or a polar organic compound-containing composition carrier or solvent to provide unexpectedly viscous carrier compositions, for delivery of the carrier or solvent, or for administration of an active compound that is dissolved or dispersed in the carrier or solvent. Such compositions, especially the high viscosity gels, are particularly useful for delivery of active compounds, such as oxidizing agents for hair waving lotions, and drugs for topical administration, since extremely high viscosities are obtainable; and for admixtures of the platelets with polar solvents in modifying rheology, e.g., of cosmetics, oil-well drilling fluids, paints, lubricants, especially food grade lubricants, in the manufacture of oil and grease, and the like. Such intercalates and/or exfoliates also are especially useful in admixture with matrix thermoplastic or thermosetting polymers in the manufacture of polymeric articles from the polar organic carrier/polymer/intercalate and/or platelet composite materials.

Once exfoliated, the platelets of the intercalate are predominantly completely separated into individual platelets and the originally adjacent platelets no longer are retained in a parallel, spaced disposition, but are free to move as predominantly individual intercalant monomer-coated (continuously or discontinuously) platelets throughout a polymer melt for enhancing one or more properties, such as strength or temperature resistance; or for mixing with a carrier or solvent material to maintain viscosity and thixotropy of the carrier material. The predominantly individual phyllosilicate platelets, having their platelet surfaces complexed with intercalant monomer molecules, are randomly, homogeneously and uniformly dispersed, predominantly as individual platelets, throughout the carrier or solvent to achieve new and unexpected viscosities in the carrier/ platelet compositions even after addition of an active organic compound, such as a cosmetic component or a medicament, for administration of the active organic compound(s) from the composition.

BRIEF DESCRIPTION OF THE DRAWINGS

FIG. 1 is a schematic representation of a top view of sodium montmorillonite clay showing the ionic charge distribution for the sodium montmorillonite clay top and interlayer surfaces showing $Na^+$ ions as the largest circles as well as magnesium and aluminum ions and Si and oxygen (Ox) atoms disposed beneath the sodium ions;

FIG. 2 is a side view (bc-projection) of the schematic representation of FIG. 1;

FIG. 3 is a schematic representation of the charge distribution on the surfaces of sodium montmorillonite clay platelets showing the distribution of positive and negative charges on the clay platelet surfaces as a result of the natural disposition of the Na, Mg, Al, Si, and oxygen (Ox) atoms of the clay shown in FIGS. 1 and 2;

DETAILED DESCRIPTION OF THE PREFERRED EMBODIMENTS

Figure 4:
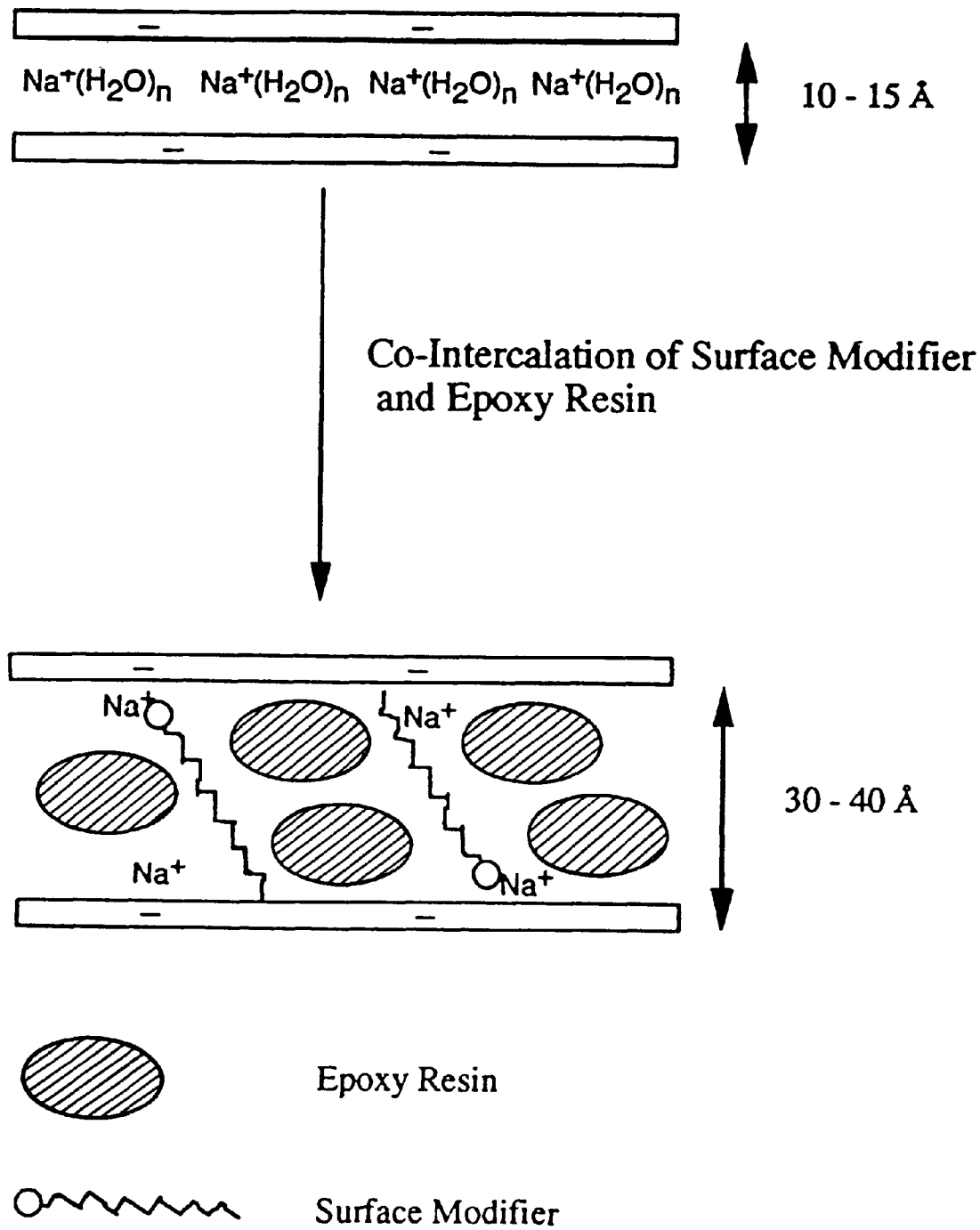
FIG. 4 is a schematic representation of an epoxy resin/ surface modifier/layered material intercalate concentrate. The layered materials have negative charge on the layer and the negative charge was compensated by the $Na^+$ cations in the intergallery region, and the $Na^+$ cations usually have coordination water around them. The intercalate concentrate was formed by co-intercalation of surface modifier and epoxy resin monomers or oligomers. The binding of the surface modifier converts the gallery properties from hydrophilic to hydrophobic. Therefore, the epoxy resin monomers, oligomers or polymers can be incorporated as shown in the figure. The gallery height or the basal spacing of the formation of the intercalate concentrate will be increased depending on the size of the surface modifier and the epoxy molecules.

To form the intercalated and exfoliated materials of the present invention, the layered material, e.g., the phyllosilicate, should be swelled or intercalated by sorption of an intercalant monomer surface modifier that includes an alkyl group having at least 6 carbon atoms. In accordance with a preferred embodiment of the present invention, the phyllosilicate should include at least 4% by weight water, up to about 5,000% by weight water, based on the dry weight of the phyllosilicate, preferably about 7% to about 100% water, more preferably about 25% to about 50% by weight water, prior to or during contact with the intercalant monomer surface modifier to achieve sufficient intercalation for exfoliation. Preferably, the phyllosilicate should include at least about 4% by weight water before contact with the intercalating carrier for efficient intercalation. The amount of intercalant monomer surface modifier in contact with the phyllosilicate from the intercalating composition, for efficient exfoliation, should provide an intercalant monomer surface modifier/phyllosilicate weight ratio (based on the dry weight of the phyllosilicate) of at least about 1:5, preferably about 1:1 to 1:5, to provide efficient sorption and complexing (intercalation) of the intercalant monomer surface modifier and intercalant polymerizable monomer/oligomer or polymer between the platelets of the layered material, e.g., phyllosilicate.

The monomer intercalants are introduced in the form of a solid or liquid composition (neat or aqueous, with or without an organic solvent, e.g., an aliphatic hydrocarbon, such as heptane) having an intercalant monomer surface modifier concentration of at least about 2%, preferably at least about 5% by weight intercalant monomer surface modifier, more preferably at least about 50% to about 100% by weight intercalant monomer surface modifier in the intercalating composition, based on the dry weight of the layered material, for intercalant monomer surface modifier sorption and sorption of a polymerizable monomer/oligomer or polymer, e.g., epoxy resin. The intercalant monomer surface modifier can be added as a solid with the addition to the layered material/intercalant monomer surface modifier blend of about 20% water, preferably at least about 30% water to about 5,000% water or more, based on the dry weight of layered material. Preferably about 30% to about 50% water, more preferably about 30% to about 40% water, based on the dry weight of the layered material, is included in the intercalating composition when extruding or pug milling, so that less water is sorbed by the intercalate, thereby necessitating less drying energy after intercalation. The polymerizable monomer/oligomer or polymer intercalant(s) together with the intercalant surface modifier ($C_6$+) may be introduced into the spaces between every layer, nearly every layer, or at least a predominance of the layers of the layered material such that the subsequently exfoliated platelet particles are preferably, predominantly less than about 5 layers in thickness; more preferably, predominantly about 1 or 2 layers in thickness; and most preferably, predominantly single platelets.

Any swellable layered material that sufficiently sorbs the intercalant monomer to increase the interlayer spacing between adjacent phyllosilicate platelets to at least about 5 Å, preferably to at least about 10 Å (when the phyllosilicate is measured dry) may be used in the practice of this invention. Useful swellable layered materials include phyllosilicates, such as smectite clay minerals, e.g., montmorillonite, particularly sodium montmorillonite; magnesium montmorillonite and/or calcium montmorillonite; nontronite; beidellite; volkonskoite; hectorite; saponite; sauconite; sobockite; stevensite; svinfordite; vermiculite; and the like. Other useful layered materials include micaceous minerals, such as illite and mixed layered illite/smectite minerals, such as rectorite, tarosovite, ledikite and admixtures of illites with the clay minerals named above.

Other layered materials having little or no charge on the layers may be useful in this invention provided they can be intercalated with the intercalant monomer/oligomer surface modifier to expand their interlayer spacing to at least about 5 Å, preferably to at least about 10 Å. Preferred swellable layered materials are phyllosilicates of the 2:1 type having a negative charge on the layers ranging from about 0.15 to about 0.9 charges per formula unit and a commensurate number of exchangeable metal cations in the interlayer spaces. Most preferred layered materials are smectite clay minerals such as montmorillonite, nontronite, beidellite, volkonskoite, hectorite, saponite, sauconite, sobockite, stevensite, and svinfordite.

As used herein the "interlayer spacing" refers to the distance between the internal faces of the adjacent layers as they are assembled in the layered material before any delamination (exfoliation) takes place. The interlayer spacing is measured when the layered material is "air dry", e.g., contains about 3–6% by weight water, e.g., 5% by weight water based on the dry weight of the layered material. The preferred clay materials generally include interlayer cations such as $Na^+$, $Ca^{+2}$, $K^+$, $Mg^{+2}$, $NH_4+$ and the like, including mixtures thereof.

The amount of intercalant monomer surface modifier intercalated into the swellable layered materials useful in this invention, in order that the intercalated layered material platelet surfaces sufficiently complex with the intercalant monomer surface modifier molecules such that the layered material may be sufficiently spaced for easy intercalation of a polymerizable monomer/oligomer or polymer that is hydrophobic, and so that the resulting intercalate is easily exfoliated or delaminated into individual platelets, may vary substantially between about 2%, preferably at least about 10%, based on the dry weight of the layered silicate material. In the preferred embodiments of the invention, amounts of monomer intercalant surface modifiers employed, with respect to the dry weight of layered material being intercalated, will preferably range from about 8 grams of intercalant monomer surface modifier:100 grams of layered material (dry basis), preferably at least about 10 grams of intercalant monomer surface modifier:100 grams of layered material to about 80–90 grams intercalant monomer surface modifier:100 grams of layered material. More preferred amounts are from about 20 grams intercalant monomer surface modifier:100 grams of layered material to about 60 grams intercalant monomer surface modifier:100 grams of layered material (dry basis).

The monomer intercalant surface modifier(s) and polymerizable monomers/oligomers or hydrophobic polymer is introduced into (sorbed within) the interlayer spaces of the layered material in one of two ways. In a preferred method of intercalating, the layered material is intimately mixed, e.g., by extrusion or pug milling, to form an intercalating composition comprising the layered material, in an intercalant monomer surface modifier/water solution, or intercalant monomer surface modifier, water, polymerizable monomer/oligomer or polymer and an organic carrier for the polymerizable intercalant monomer/oligomer or polymer. To achieve sufficient intercalation for exfoliation, the layered material/intercalant monomer surface modifier blend contains at least about 5% by weight, preferably at least about 10% by weight intercalant monomer surface modifier, based on the dry weight of the layered material, so that the resulting intercalant has interior platelet surfaces that are sufficiently hydrophobic and sufficiently spaced for intercalation of the hydrophobic polymerizable monomer/oligomer or polymer. The intercalant monomer surface modifier carrier (preferably water, with or without an organic solvent) can be added by first solubilizing or dispersing the intercalant monomer surface modifier in the carrier; or a dry intercalant monomer surface modifier and relatively dry phyllosilicate (preferably containing at least about 4% by weight water) can be blended and the intercalating carrier added to the blend, or to the phyllosilicate prior to adding the dry intercalant monomer surface modifier. In every case, it has been found that surprising sorption and complexing of polymerizable monomers/oligomers and hydrophobic polymers between surface modifier-intercalated platelets is achieved at relatively low loadings of intercalating carrier, especially $H_2O$, e.g., at least about 4% by weight water, based on the dry, weight of the phyllosilicate. When intercalating the phyllosilicate in slurry form (e.g., 900 pounds water, 100 pounds phyllosilicate, 25 pounds intercalant monomer surface modifier) the amount of water can vary from a preferred minimum of at least about 30% by weight water, with no upper limit to the amount of water in the intercalating composition (the phyllosilicate intercalate is easily separated from the intercalating composition).

Alternatively, the intercalating carrier, e.g., water, with or without an organic solvent, can be added directly to the phyllosilicate prior to adding the intercalant monomer surface modifier, either dry or in solution. Sorption of the monomer intercalant surface modifier molecules may be performed by exposing the layered material to dry or liquid intercalant monomer surface modifiers in the intercalating composition containing at least about 2% by weight, preferably at least about 5% by weight intercalant monomer surface modifier, more preferably at least about 10% intercalant monomer surface modifier, based on the dry weight of the layered material. Sorption may be aided by exposure of the intercalating composition to heat, pressure, ultrasonic cavitation, or microwaves.

In accordance with another method of intercalating the intercalant monomer surface modifier and polymerizable monomer/oligomer or hydrophobic polymer between the platelets of the layered material and exfoliating the intercalate, the layered material, containing at least about 4% by weight water, preferably about 10% to about 15% by weight water, is blended with water and/or organic solvent solution of an intercalant monomer surface modifier in a ratio sufficient to provide at least about 5% by weight, preferably at least about 10% by weight intercalant monomer surface modifier, based on the dry weight of the layered material. The polymerizable monomer/oligomer or hydrophobic polymer, or mixture thereof preferably is included in the intercalating composition simultaneously with the intercalant monomer surface modifier, or may be added after intercalation of the intercalant monomer surface modifier for subsequent intercalation before drying the surface modifier-intercalated layered material. The surface modifier-contacted and polymerizable monomer/oligomer or polymer-contacted blend then preferably is extruded for faster intercalation of the intercalant monomer with the layered material.

Figure 5:
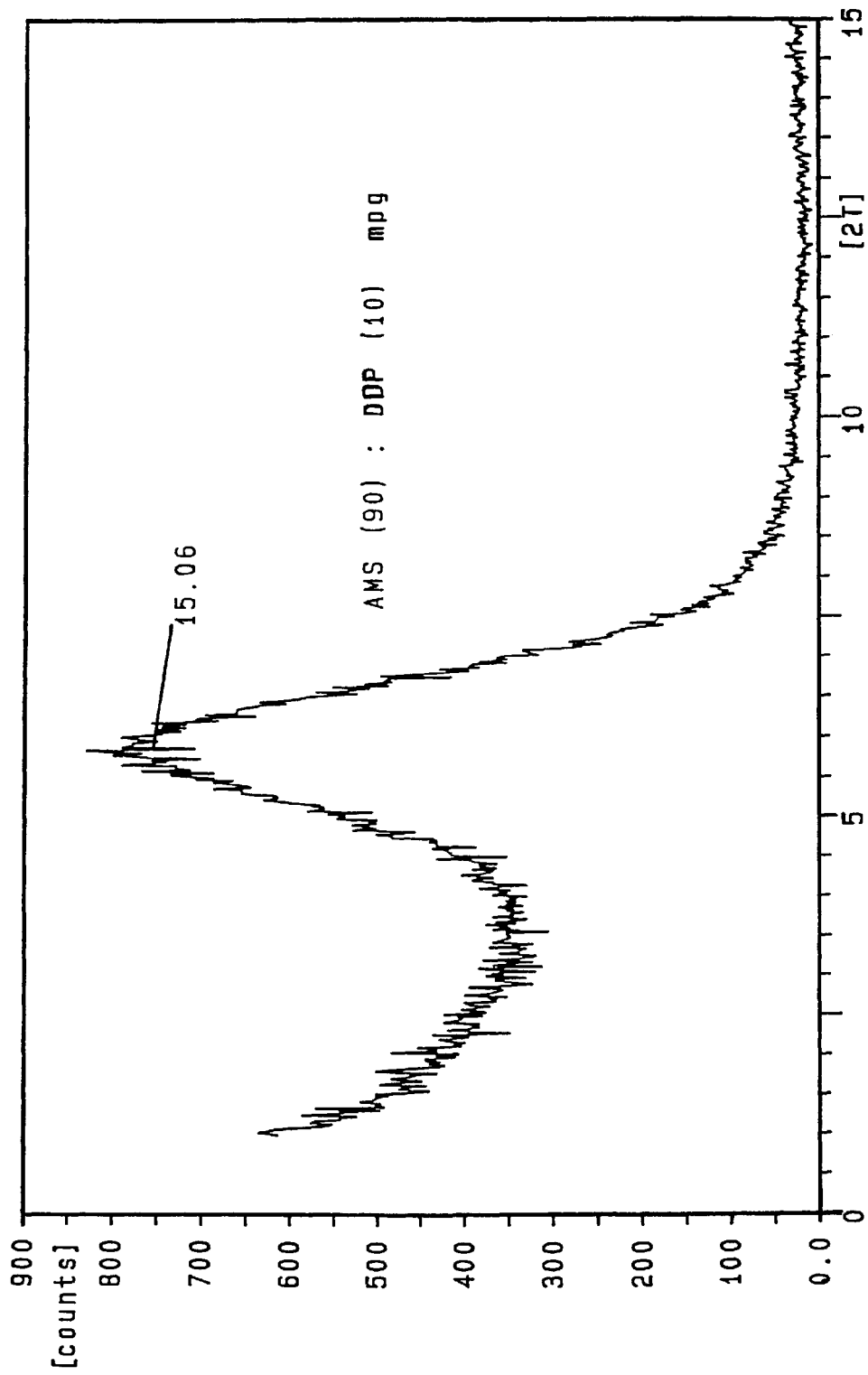
FIG. 5 is an x-ray diffraction (XRD) pattern for a complex of 10% by weight of dodecyl pyrrolidone and 90% by weight sodium montmorillonite clay.
Figure 6:
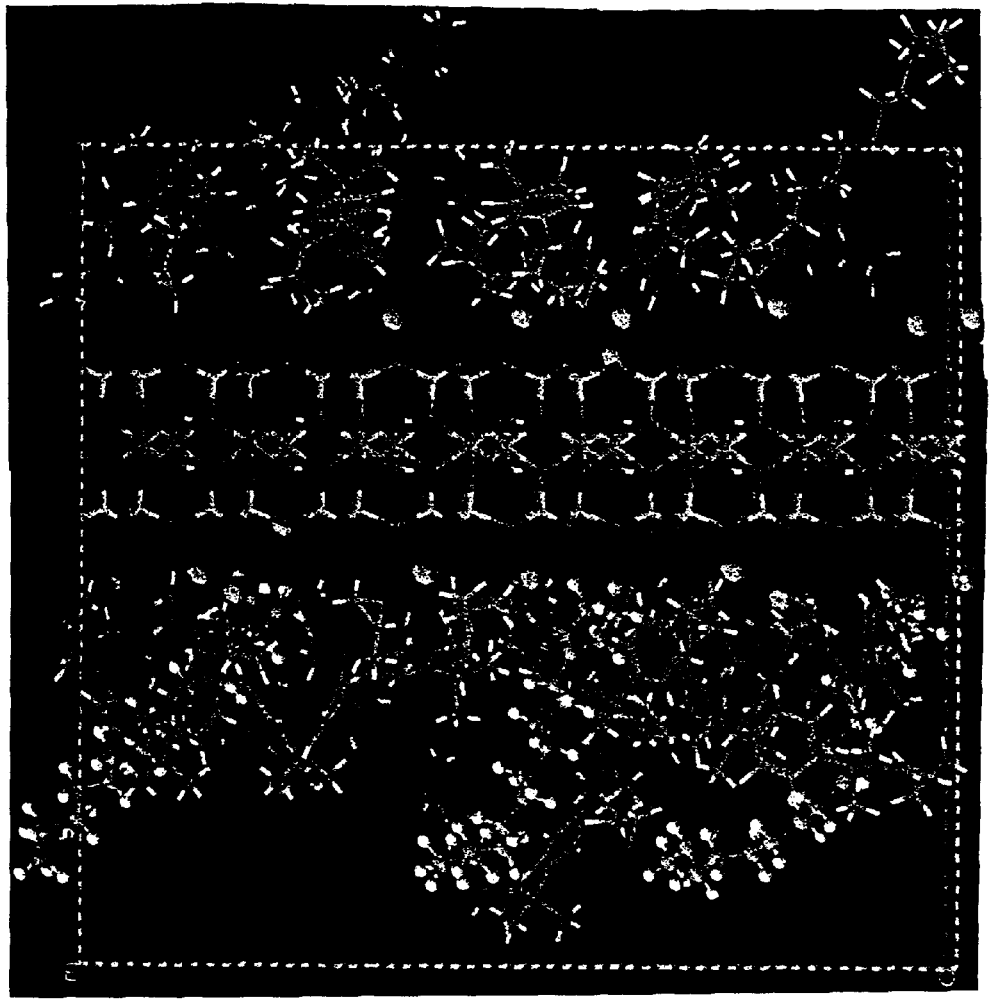
FIG. 6 is a schematic representation of a co-intercalate of a dodecylpyrrolidone surface modifier and bisphenol-A type epoxy resin in the interlayer space of montmorillonite clay.

The intercalant monomer surface modifier molecules have an affinity for the phyllosilicate, as shown in FIGS. 5 and 6, so that they are sorbed between, and are maintained associated with the cations on the inner surfaces of the silicate platelets, in the interlayer spaces, and remain complexed to the platelet surface after exfoliation. In accordance with the present invention, the intercalant monomer surface modifier should include a polar end (shown in FIGS. 5 and 6) adjacent the interlayer $Na^+$ ions in the inter-gallery or interlayer spaces between adjacent platelets of the layered material to be sufficiently bound to the platelet surfaces, it is hereby theorized, by a mechanism selected from the group consisting of ionic complexing; electrostatic complexing; chelation; hydrogen bonding; ion-dipole; dipole/dipole; Van Der Waals forces; and any combination thereof. Such bonding, via a metal cation (e.g., $Na^+$) of the phyllosilicate sharing electrons with electronegative atoms of one or more intercalant surface modifier molecule ends of one or two intercalant monomer surface modifier molecules, to an inner surface of the phyllosilicate platelets provides adherence between the polar intercalant monomer surface modifier molecule ends and the platelet inner surfaces of the layered material. Such intercalant monomers surface modifiers have sufficient affinity for the phyllosilicate platelets to maintain sufficient interlayer spacing for easy intercalation of hydrophobic polymers or polymerizable monomers and/or oligomers, and for exfoliation, without the need for coupling agents or spacing agents, such as the onium ion or silane coupling agents disclosed in the above-mentioned prior art.

Figure 7:
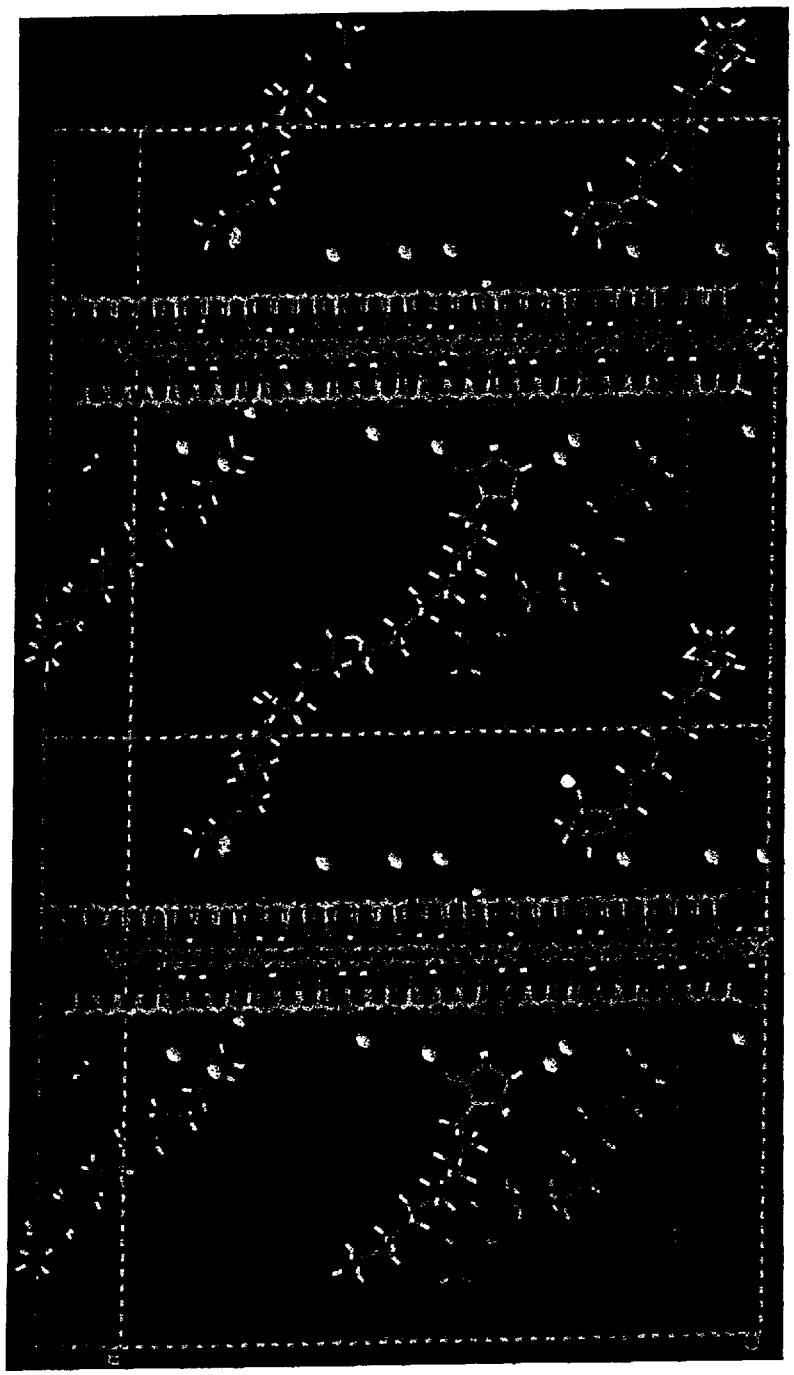
FIG. 7 is a schematic representation of the co-intercalate of FIG. 6 showing the space occupied by the dodecylpyrrolidone surface modifier in FIG. 6 showing the function of the surface modifier to open and facilitate the intercalation of monomer, oligomer or polymer intercalant into the clay interlayer space.

As shown in FIGS. 1–3, the disposition of surface $Na^+$ ions with respect to the disposition of oxygen (Ox), Mg, Si, and Al atoms, and the natural clay substitution of $Mg^{+2}$ cations for $Al^{+3}$ cations, leaving a net negative charge at the sites of substitution, results in a clay surface charge distribution as shown in FIG. 3. This alternating positive to negative surface charge over spans of the clay platelets surfaces, and on the clay platelet surfaces in the interlayer spacing, provide for excellent dipole/dipole attraction of a polar intercalant monomer surface modifier molecule, as shown schematically in FIGS. 6 and 7 for intercalation of hydrophobic polymerizable monomers/oligomers and polymers between adjacent platelets of the clay and for bonding or complexing of such surface modifier molecules and hydrophobic polymer molecules on the platelet surfaces, after exfoliation.

It is preferred that the platelet loading be less than about 10% for purposes of increasing the viscosity of an organic liquid carrier. Platelet particle loadings within the range of about 0.05% to about 40% by weight, preferably about 0.5% to about 20%, more preferably about 1% to about 10% of the composite material significantly enhances viscosity. In general, the amount of platelet particles incorporated into a liquid carrier, such as a polar solvent, e.g., a glycol such as glycerol, is less than about 90% by weight of the mixture, and preferably from about 0.01% to about 80% by weight of the composite material mixture, more preferably from about 0.05% to about 40% by weight of the mixture, and most preferably from about 0.05% to about 20% or 0.05% to about 10% by weight.

In accordance with an important feature of the present invention, the co-intercalated phyllosilicate can be manufactured in a concentrated form, e.g., 10–90%, preferably 20–80% intercalant polymerizable monomer/oligomer or polymer with or without another polar organic compound carrier and 10–90%, preferably 20–80% intercalated phyllosilicate.

Polar organic compounds having a $C_6$+ alkyl group and containing one or more hydroxy functionalities are suitable for use as intercalant monomers so long as the organic compounds have a long chain ($C_6$+) alkyl radical. Examples include long chain ($C_6$+) alcohols, including aliphatic alcohols; aromatic alcohols; aryl substituted aliphatic alcohols; alkyl substituted aromatic alcohols; and polyhydric alcohols, such as the phenols, containing a long chain ($C_6$+) alkyl group.

Detergent range aliphatic alcohols having an alkyl radical of at least 6, preferably at least 10 carbon atoms include the $C_6$–$C_{24}$ alcohols, such as hexyl alcohol; heptyl alcohol; octyl alcohol; nonyl alcohol; the $C_6$–$C_{18}$ alcohols manufactured from coconut, tallow and/or palm oils; $C_{16}$, $C_{18}$ oleyl alcohols; $C_{10}$–$C_{15}$ mixed alcohols, $C_{10}$–$C_{22}$ mixed alcohols; and $C_{13}$, $C_{15}$ alcohols manufactured from ethylene and other olefins. Additional detergent range alcohols include lauryl alcohol; myristyl alcohol; cetyl alcohol; tallow alcohol; stearyl alcohol; and oleyl alcohol. Branched detergent range alcohols, such as tridecyl alcohol ($C_{13}H_{28}O$), consisting predominantly of tetramethyl-1-nonanols also are suitable as the intercalant monomer and/or as a polar organic liquid carrier. Plasticizer range alcohols include decanol ($C_{10}H_{22}O$); and tridecyl alcohol ($C_{13}H_{28}O$).

Representative Straight-chain Alkanoic Acids,
$C_nH_{2n}O_2$ Systematic Name (Common Name)

Hexanoic; heptanoic; octanoic; decanoic ([capric]); undecanoic ([undecylic]); dodecanoic (lauric); tridecanoic ([tridecylic]); tetradecanoic (myristic); pentadecanoic ([pentadecylic]); hexadecanoic (palmitic); heptadecanoic (margaric); octadecanoic (stearic); nonadecanoic ([nonadecyclic]); eicosanoic (arachidic); docosanoic (behenic); tetracosanoic (lignoceric); hexacosanoic (cerotic); octacosanoic (montanic); triacontanoic (melissic); tritriacontanoic (psyllic); and pentatriacontanoic (ceroplastic).

Representative Straight-chain Alkenoic Acids,
$C_nH_{(2n-2)}O_2$ Systematic Name (Common Name)

Trans-4-decenoic; cis-4-decenoic; 9-decenoic (caproleic); 10-undecenoic (undecylenic); trans-3-dodecenoic (linderic); tridecenoic; cis-9-tetradecenoic (myristoleic); pentadecenoic; cis-9-hexadecenoic (cis-9-palmitoleic); trans-9-hexadecenoic (trans-9-palmitoleic); 9-heptadecenoic; cis-6-octadecenoic (petroselinic); trans-6-octadecenoic (petroselaidic); cis-9-octadecenoic (oleic); trans-9-octadecenoic (elaidic); cis-11-octadecenoic; trans-11-octadecenoic (vaccenic); cis-5-eicosenoic; cis-9-eicosenoic (gadoleic); cis-11-docosenoic (cetoleic); cis-13 docosenoic (erucic); trans-13-docosenoic (brassidic); cis-15-tetracosenoic (selacholeic); cis-17-hexacosenoic (ximenic); and cis-21-triacontenoic (lumequeic).

Representative Polyunsaturated Fatty Acids
Systematic Name (Common Name)

Representative Dienoic Acids, $C_nH_{2n-4}O_2$

Trans-2,4-decadienoic,trans-2,4-dodecadienoic; cis-9,cis-12-octadecadienoic (linoleic); trans-9,trans-12-octadecadienoic (linolelaidic); 5,6-octadecadienoic (laballenic); and 5,13-docosadienoic.

Representative Trienoic Acids, $C_nH_{2n-6}O_2$ 6,10,14-hexadecatrienoic (hiragonic); cis-9,cis-12,cis-15-octadecatrienoic (linolenic); cis-9,trans-11,trans-13-octadecatrienoic (α-eleostearic); trans-9,trans-11,trans-13-octadecatrienoic (β-eleostearic); cis-9,cis-11, trans-13-octadecatrienoic (punicic); and trans-9,trans-12,trans-15-octadecatrienoic (linolenelaidic).

Representative Tetraenoic Acids, $C_nH_{2N-8}O_2$ 4,8,12,15 octadecatetraenoic (moroctic); cis-9,trans-11,trans-13,cis-15-octadecatetraenoic (α-parinaric); trans-9,trans-11,trans-13,trans-15-octadecatetraenoic (β-parinaric); and 5,8,11,14-eicosatetraenoic (arachidonic).

Representative Substituted Acids Systematic Name
(Common Name)

2,15,16-trihydroxyhexadecanoic (ustilic); 9,10,16-trihydroxyhexadecanoic (aleuritic); 16-hydroxy-7-hexadecenoic (ambrettolic); 12-hydroxy-cis-9-octadecenoic (ricinoleic); 12-hydroxy-trans-9-octadecenoic (ricinelaidic); 4-oxo-9,11,13-octadecatrienoic (licanic); 9,10-dihydroxyoctadecanoic; 12-hydroxyoctadecanoic; 12-oxooctadecanoic; 18-hydroxy-9,11,13-octadecatrienoic (kamlolenic); 12,13-epoxy-cis-9-octadecenoic (vernolic); 8-hydroxy-trans-11-octadecene-9-ynoic (ximenynolic); 8-hydroxy-17-octadecene-9,11-diynoic (isanolic); and 14-hydroxy-cis-11-eicosenoic (lesquerolic).

Representative Long Chain ($C_6$+) Carboxylic Acids
and Uses

Acid
n-valeric
canola
castor oil acids (ricinoleic, 12-hydroxystearic)
coconut oil acids
hydrogenated and/or separated tallow-based acids
soybean oil acids
tall oil acids 2% or more rosin
less than 2% tallow fatty acids
capric
caprylic
caprylic-capric blend
lauric, 95% (dodecanoic)
myristic, 95% (tetradecanoic)
oleic
palmitic, 90%
pelargonic (nonanoic) stearic, 90%

Trialkylacetic Acids

Trialkylacetic acids are characterized by the following structure:

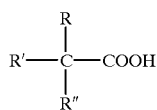

in which R, R', and R" are $C_xH_{2x+1}$, with $x \geq 1$, and wherein at least one of the R, R' and R" have at least 6 carbon atoms. The series, the products are typically mixtures of isomers, resulting from the use of mixed isomer feedstocks and the chemical rearrangements that occur in the manufacturing process.

The trialkylacetic acids have a number of uses in areas such as polymers, pharmaceuticals, agricultural chemicals, cosmetics, and metal-working fluids. Commercially important derivatives of these acids include acid chlorides, peroxyesters, metal salts, vinyl esters, and glycidyl esters.

The $C_{12}$ trialkylacetic acids, referred to as neodecanoic acid or as Versatic 6, are liquids at room temperature. These materials are typically mixtures of isomers.

Aldehydes

Representative aldehydes suitable as the intercalant monomer and/or as the polar organic carrier in accordance with the present invention include the following:

hexyl aldehyde; heptyl aldehyde; octyl aldehyde, nonyl aldehyde; decyl aldehyde; dodecyl aldehyde; octodecyl aldehyde; eicosan aldehyde; phenyl acetaldehyde; and the like.

Uses

Fatty aldehydes are used in nearly all perfume types and aromas. Polymers and copolymers of aldehydes exist and are of commercial significance.

Ketones

Suitable ketones are the organic compounds that contain one or more carbonyl groups bound to two aliphatic, aromatic, or alicyclic substituents, and are represented by the general formula

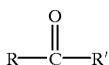

wherein R and/or R' is an alkyl group having at least 6 carbon atoms.

Amines and Amides

Polar organic compounds containing one or more amine or amide functionalities that are suitable for use as intercalate monomers and/or as the organic liquid carrier (matrix monomer) in accordance with the present invention include all organic amines and/or amides, such as the alkylamines; aminocycloalkanes and substituted aminocycloalkanes; cycloaliphatic diamines; fatty amines; and fatty amides, having a long chain ($C_6$+) alkyl group and having a dipole moment greater than the dipole moment of water.

Amines and amides are suitable alone, or in admixture, as the intercalant monomer(s) and/or as the organic solvent carrier (matrix monomer), for intercalation of the phyllosilicate and/or for admixture with the exfoliated individual platelets of the layered material in producing the nanocomposite of the present invention. The amines and amides can be any primary, secondary and/or tertiary amines or amides; including the long chain alkyl ($C_6$+) aliphatic amines; $C_6$+ alkylamines; fatty amines; $C_6$+ alkyl aromatic amines; $C_6$+ alkyl diarylamines; $C_6$+ alkyl substituted alkanolamines; and the like.

Examples of suitable amines that are useful as the intercalant monomer used for intercalation and exfoliation of the layered silicate materials, and/or as the polar organic carrier for admixture with the individual platelets in forming nanocomposite compositions are as follows:

| REPRESENTATIVE FATTY AMINES | |
|---|---|
| FATTY AMINE | MOLECULAR FORMULA |
| REPRESENTATIVE PRIMARY AMINES | |
| 1-hexylamine | $C_6H_{15}N$ |
| 1-heptylamine | $C_7H_{17}N$ |
| 1-octylamine | $C_8H_{19}N$ |
| 1-nonylamine | $C_9H_{21}N$ |
| cocoalkylamines | |
| 1-dodecylamine | $C_{12}H_{27}N$ |
| 1-hexadecylamine | $C_{16}H_{35}N$ |
| 1-octadecylamine | $C_{18}H_{39}N$ |
| oleylamine | $C_{18}H_{37}N$ |
| soyaalkylamines | |
| tallowalkylamines | |
| hydrogenated tallowalkylamines | |
| REPRESENTATIVE SECONDARY AMINES | |
| dicocoalkylamines | |
| di-n-dodecylamine | $C_{24}H_{51}N$ |
| di-n-hexadecylamine | $C_{32}H_{67}N$ |
| di-n-octadecylamine | $C_{36}H_{75}N$ |
| ditallowalkylamines | |
| dihydrogenated tallowalkylamines | |
| REPRESENTATIVE TERTIARY AMINES | |
| Alkyldimethyl | |
| cocoalkyldimethylamines | |
| dimethyl-n-octylamine | $C_{10}H_{23}N$ |
| dimethyl-n-decylamine | $C_{12}H_{27}N$ |
| dimethyl-n-dodecylamine | $C_{14}H_{31}N$ |

-continued

| REPRESENTATIVE FATTY AMINES | |
|---|---|
| FATTY AMINE | MOLECULAR FORMULA |
| dimethyl-n-tetradecylamine | $C_{16}H_{35}N$ |
| dimethyl-n-hexadecylamine | $C_{18}H_{39}N$ |
| dimethyl-n-octadecylamine | $C_{20}H_{43}N$ |
| dimethyloleylamine | $C_{20}H_{41}N$ |
| Dialkylmethyl | |
| di-n-decylmethylamine | $C_{21}H_{45}N$ |
| dicocoalkylmethylamines | |
| dihydrogenated tallowalkylmethylamines | |
| Trialkyl | |
| tri-n-octylamine | $C_{24}H_{51}N$ |
| tri-n-dodecylamine | $C_{36}H_{75}N$ |
| tri-n-hexadecylamines | |

Nanocomposite Uses

Fatty amines and chemical products derived from the amines are used in many industries. Uses for the nitrogen derivatives are as follows: fabric softeners, oil field chemicals, asphalt emulsifiers, petroleum additives, and mining.

Amine salts, especially acetate salts prepared by neutralization of a fatty amine with acetic acid, are useful as flotation agents (collectors), corrosion inhibitors, and lubricants.

Fatty amines and derivatives are widely used in the oil field, as corrosion inhibitors, surfactants, emulsifying/deemulsifying and gelling agents. In the mining industry, amines and diamines are used in the recovery and purification of minerals, e.g., by flotation. A significant use of fatty diamines is as asphalt emulsifiers for preparing asphalt emulsions. Diamines have also been used as epoxy curing agents, corrosion inhibitors, gasoline and fuel oil additives, and pigment wetting agents. In addition, derivatives of the amines, amphoterics, and long-chain alkylamines are used as anionic and cationic surfactants in the personal care industry.

The amides including, primary, secondary and tertiary amides are useful in accordance with the present invention as intercalant monomers and/or as polar organic carriers that the individual phyllosilicate platelets are dispersed in. Representative primary fatty amides are as follows:

| PRIMARY FATTY AMIDE ($RCONH_2$) | | |
|---|---|---|
| Common Name | Molecular Formula | IUPAC Name |
| ALKYL | | |
| hexylamide | $C_6H_{13}NO$ | |
| heptylamide | $C_7H_{15}NO$ | |
| octylamide | $C_8H_{17}NO$ | |
| nonylamide | $C_9H_{19}NO$ | |
| lauramide | $C_{12}H_{25}NO$ | dodecylamide |
| myristamide | $C_{14}H_{29}NO$ | tetradecylamide |
| palmitamide | $C_{16}H_{33}NO$ | hexadecylamide |
| stearamide | $C_{18}H_{37}NO$ | |

-continued

PRIMARY FATTY AMIDE (RCONH$_2$)

| Common Name | Molecular Formula | IUPAC Name |
|---|---|---|
| ALKENYL | | |
| hexenamide | C$_6$H$_{11}$NO | |
| heptenamide | C$_7$H$_{13}$NO | |
| octenamide | C$_8$H$_{15}$NO | |
| nonenamide | C$_9$H$_{17}$NO | |
| palmitoleamide | C$_{16}$H$_{31}$NO | hexadecenamide |
| oleamide | C$_{18}$H$_{35}$NO | 9-octadecenamide |
| linoleamide | C$_{18}$H$_{33}$NO | 9,12-octadecadienamide |

Polar organic compounds having a long chain (C$_6$+) alkyl group, and containing one or more ether or ester functionalities that are suitable for use as intercalate monomers and/or as the organic liquid carrier (matrix monomer) in accordance with the present invention include the organic ethers and/or esters, such as the saturated, unsaturated, cyclic, aromatic, and carboxylic ethers and esters that contain a C$_6$+ alkyl group and having a polar and group that provides the molecule with a dipole moment greater than the dipole moment of water.

Representative Alkyl Nitriles

Suitable nitrites having an alkyl radical of at least 6 carbon atoms, and a dipole moment greater than the dipole moment of water include hexanonitrile (CH$_3$(CH$_2$)$_5$CN); heptanonitrile (CH$_3$(CH$_2$)$_6$CN); octanonitrile (CH$_3$(CH$_2$)$_7$CN); nonanonitrile (CH$_3$(CH$_2$)$_7$CN); undecanonitrile (CH$_3$(CH$_2$)$_9$CN); dodecanonitrile (or lauronitrile) (CH$_3$(CH$_2$)$_{11}$CN); myristonitrile (CH$_3$(CH$_2$)$_{12}$CN); pentadecanonitrile (CH$_3$(CH$_2$)$_{13}$CN); n-heptadecanonitrile (CH$_3$(CH$_2$)$_{15}$CN); n-nonadecanitrile (CH$_3$(CH$_2$)$_{17}$CN); and mixtures thereof.

Representative N-alkyl Lactams, Including N-alkyl Pyrrolidones and Caprolactams

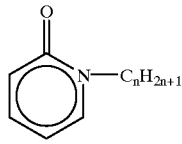

n=at least 6, preferably 10–20.

Representative Pyridines

Suitable pyridines include hexylpyridinium chloride (C$_5$H$_5$NC$_6$H$_{13}$Cl); heptylpyridinium chloride (C$_5$H$_5$NC$_7$H$_{15}$Cl); octylpyridinium chloride (C$_5$H$_5$NC$_8$H$_{17}$Cl); nonylpyridium chloride (C$_5$H$_5$NC$_9$H$_{19}$Cl); dodecylpyridinium chloride (C$_5$H$_5$NC$_{12}$H$_{25}$Cl); dodecylpyridinium bromide (C$_5$H$_5$NC$_{12}$H$_{25}$Br); hexadecylpyridinium chloride (C$_5$H$_5$NC$_{16}$H$_{33}$Cl);
hexadecylpyridinium bromide (C$_5$H$_5$NC$_{16}$H$_{33}$Br); and mixtures thereof.

Representative N-alkyl Halides

C$_n$H$_{2n}$M n=at least 6, and preferably 10–20,
M=a halogen atom (Cl, F, Br, I, At).

Representative Alkyl-substituted Lactones

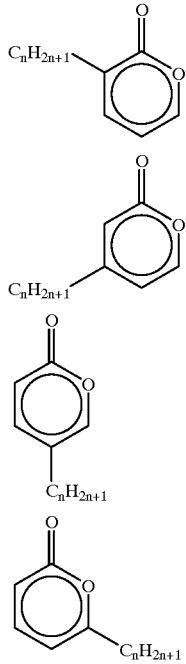

n=at least 6, preferably 10–20.

Representative Esters

Other useful, representative esters include methyl stearate; ethyl stearate; butyl stearate; dodecyl stearate; hexadecyl stearate; dimethyl maleate; dimethyl oxalate; dimethyl adipate; diethyl adipate; di(2-ethylhexyl) adipate; methyl salicylate; ethyl salicylate; methyl anthranilate; benzyl cinnamate; and mixtures thereof.

Representative Carboxylic Esters

Plasticizers
Hexyl adipate;
Heptyl adipate;
Octyl adipate;
Isodecyl adipate;
Epoxidized esters;
Sebacic acid esters, such as dibutyl sebacate;
Stearic acid esters, such as isobutyl stearate.
Surface-active Agents
Carboxylic acid esters; and anhydrosorbitol esters, such as anhydrosorbitol monolaurate; anhydrosorbitol monooleate; and anhydrosorbitol monostearate.
Ethylene glycol esters, such as ethylene glycol monolaurate.
Ethoxylated anhydrosorbitol esters, such as ethoxylated anhydrosorbitol monolaurate; ethoxylated anhydrosorbitol monooleate; ethoxylated anhydrosorbitol monostearate; ethoxylated anhydrosorbitol tristearate; ethylene glycol distearate; and ethylene glycol monostearate.

Glycerol esters, such as glycerol dilaurate; glycerol monooleate; and glycerol monostearate.

Ethoxylated natural fats and oils, such as ethoxylated castor oil, ethoxylated hydrogenated castor oil; and ethoxylated lanolin.

Poly(ethylene glycol) esters, such as poly(ethylene glycol) diester of tall oil acids; poly(ethylene glycol dilaurate); poly(ethylene glycol distearate); poly(ethylene glycol monolaurate); poly(ethylene glycol monopalmitate); poly(ethylene glycol monostearate); poly(ethylene glycol) sesquiester of tall oil acids; poly(glycerol monooleate); poly(glycerol monostearate); and 1,2-propanediol monostearate.

Miscellaneous Esters

Fatty acid esters, not included with plasticizers or surface-active agents include methyl esters of tallow; and myristyl myristate.

Polyhydric alcohol esters, such as 2-(2-butoxyethoxy) ethyl acetate; 2-butoxyethyl acetate; and glycerides, mixed $C_{14-18}$ and $C_{16-18}$, mono- and di-.

Ethers suitable as the intercalant monomer and/or as the polar organic carrier (Matrix Monomer) containing dispersed, individual silicate platelets, in accordance with the present invention, are compounds of the general formula Ar—O—R, and R—O—R' where Ar is an aryl group and R is an alkyl group having at least 6 carbon atoms.

In accordance with another embodiment of the present invention, the intercalates can be exfoliated and dispersed into one or more melt-processible thermoplastic and/or thermosetting matrix oligomers or polymers, or mixtures thereof. Matrix polymers for use in this embodiment of the process of this invention may vary widely, the only requirement is that they are melt processible. In this embodiment of the invention, the polymer includes at least ten (10), preferably at least thirty (30). recurring monomeric units. The upper limit to the number of recurring monomeric units is not critical, provided that the melt index of the matrix polymer under use conditions is such that the matrix polymer forms a flowable mixture. Most preferably, the matrix polymer includes from at least about 10 to about 100 recurring monomeric units. In the most preferred embodiments of this invention, the number of recurring units is such that the matrix polymer has a melt index of from about 0.01 to about 12 grams per 10 minutes at the processing temperature.

Thermoplastic resins and rubbers for use as matrix monomers, oligomers or polymers in the practice of this invention may vary widely. Illustrative of useful thermoplastic resins, which may be used alone or in admixture, are polyactones such as poly(pivalolactone), poly(caprolactone) and the like; polyurethanes derived from reaction of diisocyanates such as 1,5-naphthalene diisocyanate; p-phenylene diisocyanate, m-phenylene diisocyanate, 2,4-toluene diisocyanate, 4,4'-diphenylmethane diisocyanate, 3,3'-dimethyl-4,4'-biphenyl diisocyanate, 4,4'-diphenylisopropylidene diisocyanate, 3,3'-dimethyl-4,4'-diphenyl diisocyanate, 3,3', -dimethyl-4,4'-diphenylmethane diisocyanate, 3,3', -dimethoxy-4,4'-biphenyl diisocyanate, dianisidine diisocyanate, toluidine diisocyanate, hexamethylene diisocyanate, 4,4'-diisocyanatodiphenylmethane and the like and linear long-chain diols such as poly(tetramethylene adipate), poly(ethylene adipate), poly(1,4-butylene adipate), poly(ethylene succinate), poly(2,3-butylene succinate), polyether diols and the like; polycarbonates such as poly[methane bis(4-phenyl) carbonate], poly[1,1-ether bis(4-phenyl) carbonate], poly[diphenylmethane bis(4-phenyl)carbonate], poly[1,1-cyclohexane bis(4-phenyl)carbonate] and the like; polysulfones; polyethers; polyketones; polyamides such as poly(4-amino butyric acid), poly(hexamethylene adipamide), poly(6-aminohexanoic acid), poly(m-xylylene adipamide), poly(p-xylylene sebacamide), poly(2,2,2-trimethyl hexamethylene terephthalamide), poly(metaphenylene isophthalamide) (NOMEX), poly(p-phenylene terephthalamide) (KEVLAR), and the like; polyesters such as poly(ethylene azelate), poly(ethylene-1,5-naphthalate, poly(1,4-cyclohexane dimethylene terephthalate), poly(ethylene oxybenzoate) (A-TELL), poly(para-hydroxy benzoate) (EKONOL), poly(1,4-cyclohexylidene dimethylene terephthalate) (KODEL) (cis), poly(1,4-cyclohexylidene dimethylene terephthalate) (KODEL) (trans), polyethylene terephthalate, polybutylene terephthalate and the like; poly(arylene oxides) such as poly(2,6-dimethyl-1,4-phenylene oxide), poly(2,6-diphenyl-1,4-phenylene oxide) and the like; poly(arylene sulfides) such as poly(phenylene sulfide) and the like; polyetherimides; vinyl polymers and their copolymers such as polyvinyl acetate, polyvinyl alcohol, polyvinyl chloride; polyvinyl butyral, polyvinylidene chloride, ethylene-vinyl acetate copolymers, and the like; polyacrylics, polyacrylate and their copolymers such as polyethyl acrylate, poly(n-butyl acrylate), polymethylmethacrylate, polyethyl methacrylate, poly(n-butyl methacrylate), poly(n-propyl methacrylate), polyacrylamide, polyacrylonitrile, polyacrylic acid, ethylene-acrylic acid copolymers, ethylene-vinyl alcohol copolymers acrylonitrile copolymers, methyl methacrylate-styrene copolymers, ethylene-ethyl acrylate copolymers, methacrylated butadiene-styrene copolymers and the like; polyolefins such as low density poly(ethylene), poly(propylene), chlorinated low density poly(ethylene), poly(4-methyl-l-pentene), poly(ethylene), poly(styrene), and the like; ionomers; poly(epichlorohydrins); poly(urethane) such as the polymerization product of diols such as glycerin, trimethylol-propane, 1,2,6-hexanetriol, sorbitol, pentaerythritol, polyether polyols, polyester polyols and the like with a polyisocyanate such as 2,4-tolylene diisocyanate, 2,6-tolylene diisocyante, 4,4'-diphenylmethane diisocyanate, 1,6-hexamethylene diisocyanate, 4,4'-dicyclohexylmethane diisocyanate and the like; and polysulfones such as the reaction product of the sodium salt of 2,2-bis(4-hydroxyphenyl) propane and 4,4'-dichlorodiphenyl sulfone; furan resins such as poly(furan); cellulose ester plastics such as cellulose acetate, cellulose acetate butyrate, cellulose propionate and the like; silicones such as poly(dimethyl siloxane), poly(dimethyl siloxane co-phenylmethyl siloxane), and the like; protein plastics; and blends of two or more of the foregoing.

Vulcanizable and thermoplastic rubbers useful as matrix polymers in the practice of this embodiment of the invention may also vary widely. Illustrative of such rubbers are brominated butyl rubber, chlorinate butyl rubber, polyurethane elastomers, fluoroelastomers, polyester elastomers, polyvinylchloride, butadiene/acrylonitrile elastomers, silicone elastomers, poly(butadiene), poly(isobutylene), ethylene-propylene copolymers, ethylene-propylene-diene terpolymers, sulfonated ethylene-propylene-diene terpolymers, poly(chloroprene), poly(2,3-dimethylbutadiene), poly(butadiene-pentadiene), chlorosulphonated poly(ethylenes), poly(sulfide) elastomers, block copolymers, made up of segments of glassy or crystalline blocks such as poly(styrene), poly(vinyl-toluene), poly(t-butyl styrene), polyesters and the like and the elastomeric blocks such as poly(butadiene), poly(isoprene), ethylene-propylene copolymers, ethylene-butylene copolymers, polyether and the like as for example the copolymers in poly (styrene)-poly(butadiene)-poly(styrene) block copolymer manufactured by Shell Chemical Company under the trade name KRATON®.

Useful thermosetting resins useful as matrix polymers include, for example, the polyamides; polyalkylamides; polyesters; polyurethanes; polycarbonates; polyepoxides; and mixtures thereof.

Most preferred thermoplastic polymers for use as a matrix polymer are thermoplastic polymers such as polyamides, polyesters, and polymers of alpha-beta unsaturated monomers and copolymers. Polyamides which may be used in the process of the present invention are synthetic linear polycarbonamides characterized by the presence of recurring carbonamide groups as an integral part of the polymer chain which are separated from one another by at least two carbon atoms. Polyamides of this type include polymers, generally known in the art as nylons, obtained from diamines and dibasic acids having the recurring unit represented by the general formula:

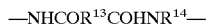
—NHCOR$^{13}$COHNR$^{14}$— in which R$^{13}$ is an alkylene group of at least 2 carbon atoms, preferably from about 2 to about 11, or arylene having at least about 6 carbon atoms, preferably about 6 to about 17 carbon atoms; and R$^{14}$ is selected from R$^{13}$ and aryl groups. Also, included are copolyamides and terpolyamides obtained by known methods, for example, by condensation of hexamethylene diamine and a mixture of dibasic acids consisting of terephthalic acid and adipic acid. Polyamides of the above description are well-known in the art and include, for example, the copolyamide of 30% hexamethylene diammonium isophthalate and 70% hexamethylene diammonium adipate, poly(hexamethylene adipamide) (nylon 6,6), poly(hexamethylene sebacamide) (nylon 6,10), poly(hexamethylene isophthalamide), poly(hexamethylene terephthalamide), poly(heptamethyene pimelamide) (nylon 7,7), poly(octamethylen sebacamide) (nylon 8,8), poly (nonamethylene azelamide) (nylon 9,9) poly(decamethylene azelamide) (nylon 10,9), poly(decamethylene sebacamide) (nylon 10,10), poly[bis(4-amino cyclohexyl)methane-1,10-decanecarboxamide)], poly(m-xylylene adipamide), poly(p-xylylene sebacamide), poly(2,2,2-trimethyl hexamethylene terephthalamide), poly(piperazine sebacamide), poly(p-phenylene terephthalamide), poly(metaphenylene isophthalamide) and the like.

Other useful polyamides for use as a matrix polymer are those formed by polymerization of amino acids and derivatives thereof, as, for example, lactams. Illustrative of these useful polyamides are poly(4-aminobutyric acid) (nylon 4), poly(6-aminohexanoic acid) (nylon 6), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12) and the like.

Preferred polyamides for use as a matrix polymer are poly(caprolactam), poly(12-aminododecanoic acid) and poly(hexamethylene adipamide).

Other matrix or host polymers which may be employed in admixture with exfoliates to form nanocomposites are linear polyesters. The type of polyester is not critical and the particular polyesters chosen for use in any particular situation will depend essentially on the physical properties and features, i.e., tensile strength, modulus and the like, desired in the final form. Thus, a multiplicity of linear thermoplastic polyesters having wide variations in physical properties are suitable for use in admixture with exfoliated layered material platelets in manufacturing nanocomposites in accordance with this invention.

The particular polyester chosen for use as a matrix polymer can be a homo-polyester or a copolyester, or mixtures thereof, as desired. Polyesters are normally prepared by the condensation of an organic dicarboxylic acid and an organic diol, and, the reactants can be added to the intercalates, or exfoliated intercalates for in situ polymerization of the polyester while in contact with the layered material, before or after exfoliation of the intercalates.

Polyesters which are suitable for use as matrix polymers in this embodiment of the invention are those which are derived from the condensation of aromatic, cycloaliphatic, and aliphatic diols with aliphatic, aromatic and cycloaliphatic dicarboxylic acids and may be cycloaliphatic, aliphatic or aromatic polyesters.

Exemplary of useful cycloaliphatic, aliphatic and aromatic polyesters which can be utilized as matrix polymers in the practice of this embodiment of the invention are poly (ethylene terephthalate), poly(cyclohexylenedimethylene terephthalate), poly(ethylene dodecate), poly(butylene terephthalate), poly[ethylene(2,7-naphthalate)], poly (methaphenylene isophthalate), poly(glycolic acid), poly (ethylene succinate), poly(ethylene adipate), poly(ethylene sebacate), poly(decamethylene azelate), poly (decamethylene adipate), poly(decamethylene sebacate), poly(dimethylpropiolactone), poly(parahydroxybenzoate) (EKONOL), poly(ethylene oxybenzoate) (A-tell), poly (ethylene isophthalate), poly(tetramethylene terephthalate, poly(hexamethylene terephthalate), poly(decamethylene terephthalate), poly(1,4-cyclohexane dimethylene terephthalate) (trans), poly(ethylene 1,5-naphthalate), poly (ethylene 2,6-naphthalate), poly(1,4-cyclohexylidene dimethylene terephthalate), (KODEL) (cis), and poly(1,4-cyclohexylidene dimethylene terephthalate (KODEL) (trans).

Polyester compounds prepared from the condensation of a diol and an aromatic dicarboxylic acid are especially suitable as matrix polymers in accordance with this embodiment of the present invention. Illustrative of such useful aromatic carboxylic acids are terephthalic acid, isophthalic acid and a o-phthalic acid, 1,3-naphthalenedicarboxylic acid, 1,4-naphthalenedicarboxylic acid, 2,6-naphthalenedicarboxylic acid, 2,7-naphthalenedicarboxylic acid, 4,4', -diphenyldicarboxylic acid, 4,4'-diphenylsulfonedicarboxylic acid, 1,1,3-trimethyl-5-carboxy-3-(p-carboxyphenyl)-idane, diphenyl ether 4,4'-dicarboxylic acid, bis-p(carboxy-phenyl) methane and the like. Of the aforementioned aromatic dicarboxylic acids, those based on a benzene ring (such as terephthalic acid, isophthalic acid, orthophthalic acid) are preferred for use in the practice of this invention. Among these preferred acid precursors, terephthalic acid is particularly preferred acid precursor.

The most preferred matrix polymer for incorporation with exfoliates manufactured in accordance with the present invention is a polymer selected from the group consisting of poly(ethylene terephthalate), poly(butylene terephthalate), poly(1,4-cyclohexane dimethylene terephthalate), a polyvinylimine, and mixtures thereof. Among these polyesters of choice terephthalate) and poly(butylene terephthalate) are most preferred.

Still other useful thermoplastic homopolymers and copolymer matrix polymers for forming nanocomposites with the exfoliates of the present invention are polymers formed by polymerization of alpha-beta-unsaturated monomers or the formula:

$R^{15}R^{16}C$=$CH_2$ wherein:

$R^{15}$ and $R^{16}$ are the same or different and are cyano, phenyl, carboxy, alkylester, halo, alkyl, alkyl substituted with one or more chloro or fluoro, or hydrogen. Illustrative of such preferred homopolymers and copolymers are homopolymers and copolymers of ethylene, propylene, vinyl alcohol, acrylonitrile, vinylidene chloride, esters of acrylic acid, esters of methacrylic acid, chlorotrifluoroethylene, vinyl chloride and the like. Preferred are poly(propylene), propylene copolymers, poly(ethylene) and ethylene copolymers. More preferred are poly(ethylene) and poly(propylene).

The mixture may include various optional components which are additives commonly employed with polar organic liquids. Such optional components include nucleating agents, fillers, plasticizers, impact modifiers, chain extenders, plasticizers, colorants, mold release lubricants, antistatic agents, pigments, fire retardants, and the like. These optional components and appropriate amounts are well known to those skilled in the art.

The amount of intercalated and/or exfoliated layered material included in the liquid carrier or solvent compositions to form the viscous compositions suitable to deliver the carrier or some carrier-dissolved or carrier-dispersed active material, such as a pharmaceutical, may vary widely depending on the intended use and desired viscosity of the composition. For example, relatively higher amounts of intercalates, i.e., from about 10% to about 30% by weight of the total composition, are used in forming solvent gels having extremely high viscosities, e.g., 5,000 to 5,000,000 centipoises. Extremely high viscosities, however, also can be achieved with a relatively small concentration of intercalates and/or exfoliates thereof, e.g., 0.1% to 5% by weight, by adjusting the pH of the composition in the range of about 0–6 or about 10–14 and/or by heating the composition above room temperature, e.g., in the range of about 25° C. to about 200° C., preferably about 75° C. to about 100° C. It is preferred that the intercalate or platelet loading be less than about 10% by weight of the composition. Intercalate or platelet particle loadings within the range of about 0.01% to about 40% by weight, preferably about 0.05% to about 20%, more preferably about 0.5% to about 10% of the total weight of the composition significantly increases the viscosity of the composition. In general, the amount of intercalate and/or platelet particles incorporated into the carrier/solvent is less than about 20% by weight of the total composition, and preferably from about 0.05% to about 20% by weight of the composition, more preferably from about 0.01% to about 10% by weight of the composition, and most preferably from about 0.01% to about 5%, based on the total weight of the composition.

In accordance with an important feature of the present invention, the intercalate and/or platelet/carrier compositions of the present invention can be manufactured in a concentrated form, e.g., as a master gel, e.g., having about 10–90%, preferably about 20–80% intercalate and/or exfoliated platelets of layered material and about 10–90%, preferably about 20–80% carrier/solvent. The master gel can be later diluted and mixed with additional carrier or solvent to reduce the viscosity of the composition to a desired level.

The intercalates, and/or exfoliates thereof, are mixed with a carrier or solvent to produce viscous compositions of the carrier or solvent optionally including one or more active compounds, such as an antiperspirant compound, dissolved or dispersed in the carrier or solvent.

In accordance with an important feature of the present invention, a wide variety of topically-active compounds can be incorporated into a stable composition of the present invention, wherein the topically active compounds are co-intercalated in the clay interlayer spacing with the surface modifier. Such topically active compositions include cosmetic, industrial, and medicinal compounds that act upon contact with the skin or hair, or are used to adjust rheology of industrial greases and the like. In accordance with another important feature of the present invention, a topically-active compound can be solubilized in the composition of the present invention or can be homogeneously dispersed throughout the composition as an insoluble, particulate material. In either case topically-effective compositions of the present invention are resistant to composition separation and effectively apply the topically-active compound to the skin or hair. If required for stability, a surfactant can be included in the composition, such as any disclosed in Laughlin, et al. U.S. Pat. No. 3,929,678, hereby incorporated by reference. In general, the topically-effective compositions of the present invention demonstrate essentially no phase separation if the topically-active compound is solubilized in the compositions. Furthermore, if the topically-active compound is insoluble in the composition, the composition demonstrates essentially no phase separation.

The topically-active compounds can be a cosmetically-active compound, a medically-active compound or any other compound that is useful upon application to the skin or hair. Such topically-active compounds include, for example, antiperspirants, antidandruff agents, antibacterial compounds, antifungal compounds, anti-inflammatory compounds, topical anesthetics, sunscreens and other cosmetic and medical topically-effective compounds.

Therefore, in accordance with an important feature of the present invention, the stable topically-effective composition can include any of the generally-known antiperspirant compounds such as finely-divided solid astringent salts, for example, aluminum chlorohydrate, aluminum chlorohydrox, zirconium chlorohydrate, and complexes of aluminum chlorohydrate with zirconyl chloride or zirconyl hydroxychloride. In general, the amount of the antiperspirant compound, such as aluminum zirconium tetrachlorohydrex glycine in the composition can range from about 0.01% to about 50%, and preferably from about 0.1% to about 30%, by weight of the total composition.

Other topically-active compounds can be included in the compositions of the present invention in an amount sufficient to perform their intended function. For example, zinc oxide, titanium dioxide or similar compounds can be included if the composition is intended to be a sunscreen. Similarly, topically-active drugs, like antifungal compounds; antibacterial compounds; anti-inflammatory compounds; topical anesthetics; skin rash, skin disease and dermatitis medications; and anti-itch and irritation-reducing compounds can be included in the compositions of the present invention. For example, analgesics such as benzocaine, dyclonine hydrochloride, aloe vera and the like; anesthetics such as butamben picrate, lidocaine hydrochloride, zylocaine and the like; antibacterials and antiseptics, such as povidone-iodine, polymyxin b sulfate-bacitracin, zinc-neomycin sulfate-hydrocortisone, chloramphenicol, methylbenzethonium chloride, and erythromycin and the like; antiparasitics, such as lindane; deodorants, such as chlorophyllin copper complex, aluminum chloride, aluminum chloride hexahydrate, and methylbenzethonium chloride; essentially all dermatologicals, like acne preparations, such as benzoyl peroxide, erythromycin-benzoyl peroxide, clindamycin phosphate, 5,7-dichloro-8-hydroxyquinoline, and the like; anti-inflammatory agents, such as alclometasone dipropionate, betamethasone valerate, and the like; burn relief ointments, such as o-amino-p-toluenesulfonamide monoacetate and the like; depigmenting agents, such as monobenzone; dermatitis relief agents, such as the active steroids amcinonide, diflorasone diacetate, hydrocortisone, and the like; diaper rash relief agents, such as methylbenzethonium chloride and the like; emollients and moisturizers, such as mineral oil, PEG-4 dilaurate, lanolin oil, petrolatum, mineral wax and the like; fungicides, such as butocouazole nitrate, haloprogin, clotrimazole, and the like; herpes treatment drugs, such as 9-[(2-hydroxyethoxy)methyl]guanine; pruritic medications, such as alclometasone dipropionate, betamethasone valerate, isopropyl myristate MSD, and the like; psoriasis, seborrhea and scabicide agents, such as anthralin, methoxsalen, coal tar and the like; sunscreens, such as octyl p-(dimethylamino)benzoate, octyl methoxycinnamate, oxybenzone and the like; steroids, such as 2-(acetyloxy)-9-fluoro-1',2',3',4'-tetrahydro-11-hydroxypregna-1,4-dieno [16,17-b] naphthalene-3,20-dione, and 21-chloro-9-fluoro-1',2',3',4'-tetrahydro-11b-hydroxypregna-1,4-dieno[16z,17-b]naphthalene-3,20-dione. Any other medication capable of topical administration also can be incorporated in composition of the present invention in an amount sufficient to perform its intended function.

Eventual exfoliation of the intercalated layered material should provide delamination of at least about 90% by weight of the intercalated material to provide a more viscous composition comprising a carrier or solvent having monomer-complexed platelet particles substantially homogeneously dispersed therein. Some intercalates require a shear rate that is greater than about 10 sec$^{-1}$ for such relatively thorough exfoliation. Other intercalates exfoliate naturally or by heating, or by applying low pressure, e.g., 0.5 to 60 atmospheres above ambient, with or without heating. The upper limit for the shear rate is not critical. In the particularly preferred embodiments of the invention, when shear is employed for exfoliation, the shear rate is from greater than about 10 sec$^{-1}$ to about 20,000 sec$^{-1}$, and in the more preferred embodiments of the invention the shear rate is from about 100 sec$^{-1}$ to about 10,000 sec$^{-1}$.

When shear is employed for exfoliation, any method which can be used to apply a shear to the intercalant/carrier composition can be used. The shearing action can be provided by any appropriate method, as for example by mechanical means, by thermal shock, by pressure alteration, or by ultrasonics, all known in the art. In particularly useful procedures, the composition is sheared by mechanical methods in which the intercalate, with or without the carrier or solvent, is sheared by use of mechanical means, such as stirrers, Banbury® type mixers, Brabender® type mixers, long continuous mixers, and extruders. Another procedure employs thermal shock in which shearing is achieved by alternatively raising or lowering the temperature of the composition causing thermal expansions and resulting in internal stresses which cause the shear. In still other procedures, shear is achieved by sudden pressure changes in pressure alteration methods; by ultrasonic techniques in which cavitation or resonant vibrations which cause portions of the composition to vibrate or to be excited at different phases and thus subjected to shear. These methods of shearing are merely representative of useful methods, and any method known in the art for shearing intercalates may be used.

Mechanical shearing methods may be employed such as by extrusion, injection molding machines, Banbury® type mixers, Brabender® type mixers and the like. Shearing also can be achieved by introducing the layered material and intercalant monomer at one end of an extruder (single or double screw) and receiving the sheared material at the other end of the extruder. The temperature of the layered material/intercalant monomer composition, the length of the extruder, residence time of the composition in the extruder and the design of the extruder (single screw, twin screw, number of flights per unit length, channel depth, flight clearance, mixing zone, etc.) are several variables which control the amount of shear to be applied for exfoliation.

Exfoliation should be sufficiently thorough to provide at least about 80% by weight, preferably at least about 85% by weight, more preferably at least about 90% by weight, and most preferably at least about 95% by weight delamination of the layers to form two monomer layer tactoids that include three platelets or, more preferably, individual platelet particles that can be substantially homogeneously dispersed in the carrier or solvent. As formed by this process, the platelet particles or platelet multi-layer tactoids dispersed in the carrier or solvent have the thickness of the individual layers plus one to five monolayer thicknesses of complexed monomer, or small multiples less than about 10, preferably less than about 5 and more preferably less than about 3 of the layers, and still more preferably 1 or 2 layers. In the preferred embodiments of this invention, intercalation and delamination of every interlayer space is complete so that all or substantially all individual layers delaminate one from the other to form separate platelet particles for admixture with the carrier or solvent. The compositions can include the layered material as all intercalate, completely without exfoliation, initially to provide relatively low viscosities for transportation and pumping until it is desired to increase viscosity via easy exfoliation. In cases where intercalation is incomplete between some layers, those layers will not delaminate in the carrier or solvent, and will form platelet particles comprising those layers in a coplanar aggregate.

The effect of adding into a polar organic liquid carrier the nanoscale particulate dispersed platelet particles, derived from the intercalates formed in accordance with the present invention, typically is an increase in viscosity.

Molding compositions comprising a thermoplastic or thermosetting polymer containing a desired loading of platelets obtained from exfoliation of the intercalates manufactured according to the invention are outstandingly suitable for the production of sheets and panels having valuable properties. Such sheets and panels may be shaped by conventional processes such as vacuum processing or by hot pressing to form useful objects. The sheets and panels according to the invention are also suitable as coating materials for other materials comprising, for example, wood, glass, ceramic, metal or other plastics, and outstanding strengths can be achieved using conventional adhesion promoters, for example, those based on vinyl resins. The sheets and panels can also be laminated with other plastic films and this is preferably effected by co-extrusion, the sheets being bonded in the molten state. The surfaces of the sheets and panels, including those in the embossed form, can be improved or finished by conventional methods, for example by lacquering or by the application of protective films.

Matrix polymer/platelet composite materials are especially useful for fabrication of extruded films and film laminates, as for example, films for use in food packaging. Such films can be fabricated using conventional film extrusion techniques. The films are preferably from about 10 to about 100 microns, more preferably from about 20 to about 100 microns and most preferably from about 25 to about 75 microns in thickness.

The homogeneously distributed platelet particles, exfoliated in accordance with the present invention, and matrix polymer that form the nanocomposites of one embodiment of the present invention are formed into a film by suitable film-forming methods. Typically, the composition is melted and forced through a film forming die. The film of the nanocomposite may go through steps to cause the platelets to be further oriented so the major planes through the platelets are substantially parallel to the major plane through the film. A method to do this is to biaxially stretch the film. For example, the film is stretched in the axial or machine direction by tension rollers pulling the film as it is extruded from the die. The film is simultaneously stretched in the transverse direction by clamping the edges of the film and drawing them apart. Alternatively, the film is stretched in the transverse direction by using a tubular film die and blowing the film up as it passes from the tubular film die. The films may exhibit one or more of the following benefits: increased modulus; increased wet strength; increased dimensional stability; decreased moisture adsorption; decreased permeability to gases such as oxygen and liquids, such as water, alcohols and other solvents.

The following specification examples are presented to more particularly illustrate the invention and are not to be construed as limiting the scope of the invention.

Example 1 illustrates the formation of a DDP/Epoxy/Clay co-intercalate concentrate. Example 2 is a comparative example which shows the intercalation of epoxy resin into Na-clay without including a surface modifier. Example 3 further illustrates the formation of a co-intercalate concentrate from a surface modifier, an epoxy resin and clay by using a different surface modifier (Neodol) and by using longer chain 1-octadecyl-2 pyrrolidone. Example 4 demonstrates the formation of a co-intercalate concentrate formed from a surface modifier (DDP) with polymeric (polydimethylsiloxane) materials and clay. Example 5 shows the formation of exfoliated nanocomposites by using the DDP/Epoxy/Clay co-intercalate concentrate and describes various properties of the nanocomposites.

EXAMPLE 1

Figure 8:
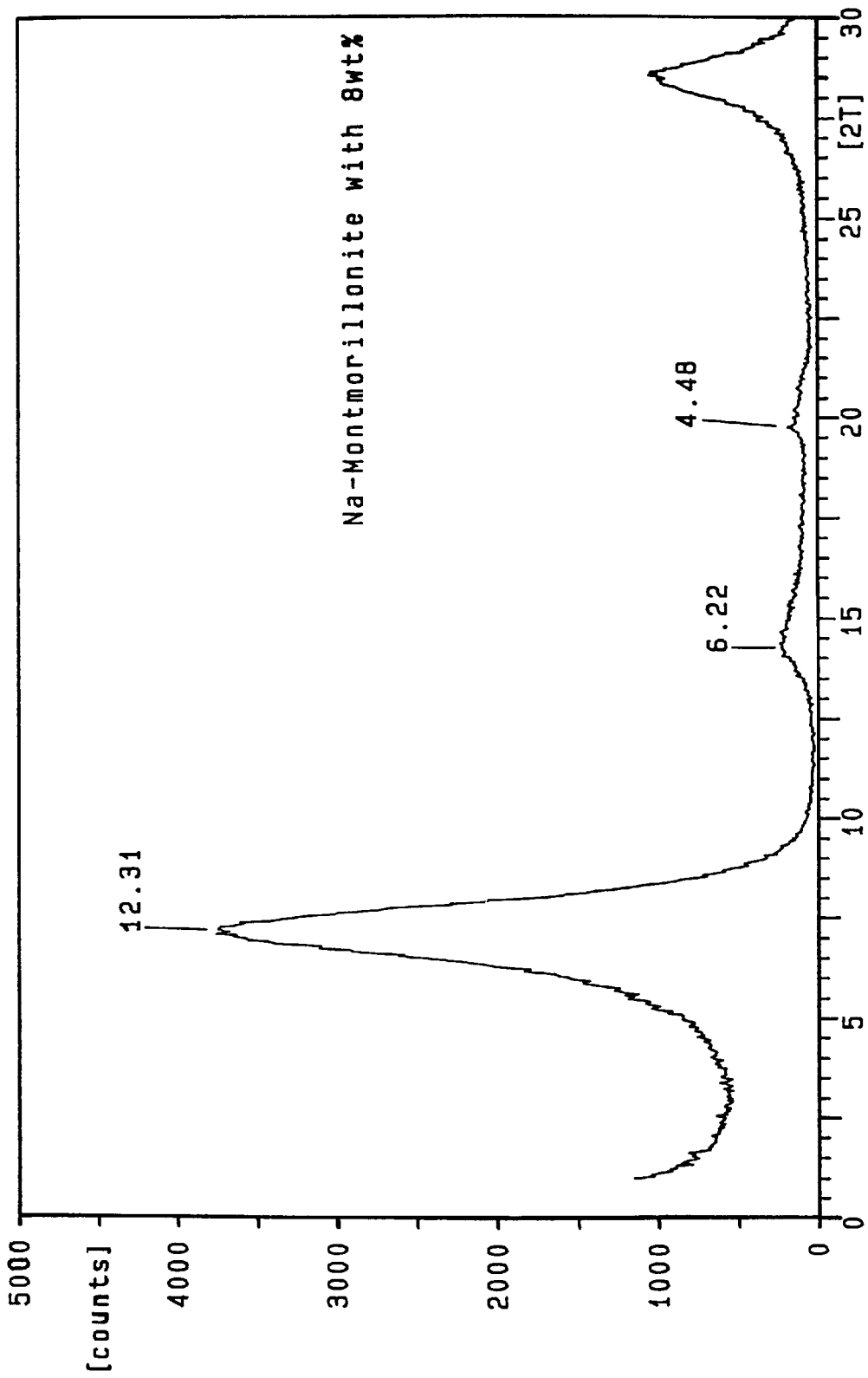
FIG. 8 is an x-ray diffraction (XRD) pattern of Na-montmorillonite clay with about 8 weight percent water.
Figure 9:
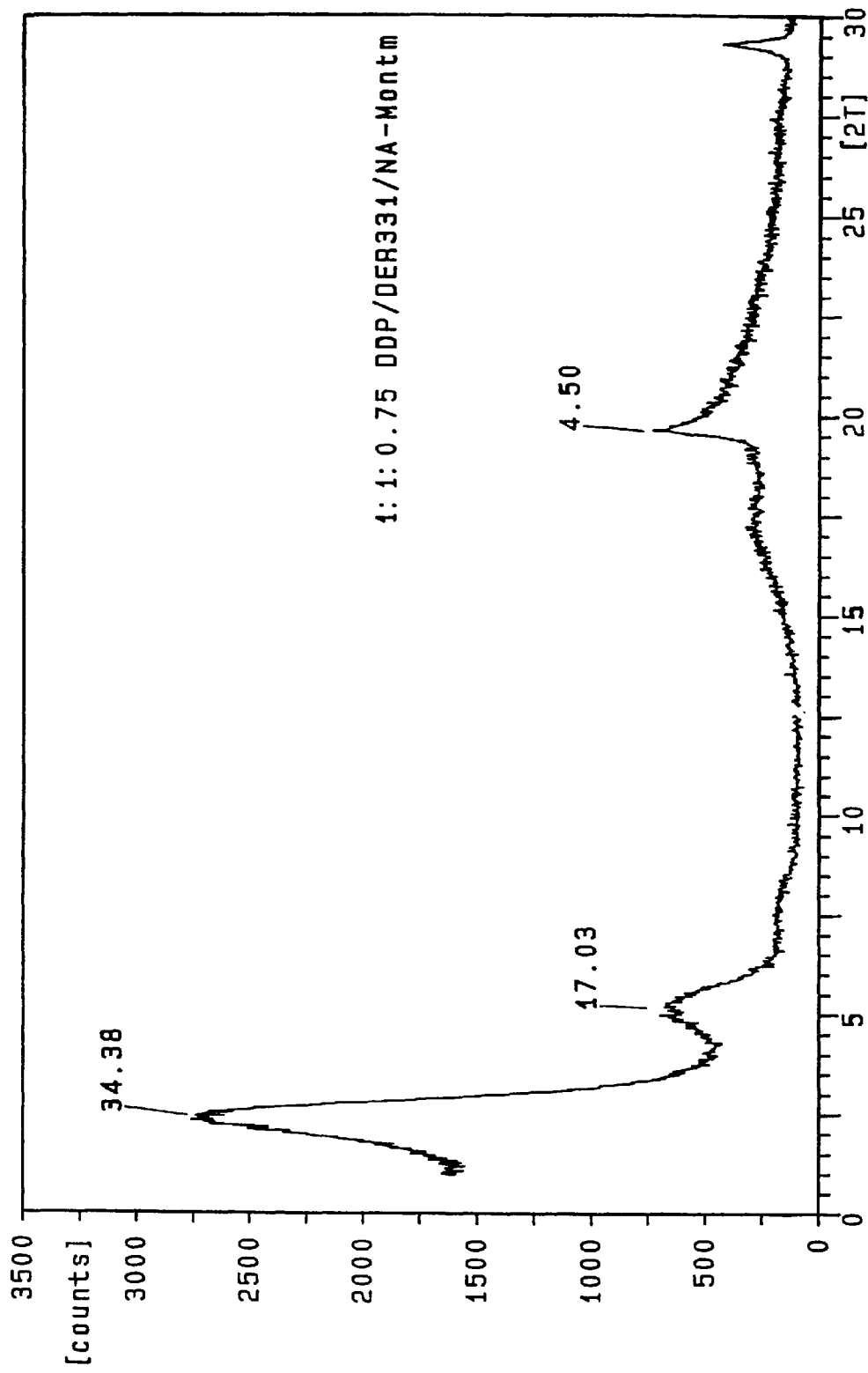
FIG. 9 is an x-ray diffraction (XRD) pattern of the intercalate concentrate (1:1:0.75) with a molar ratio of dodecyl pyrrolidone (DDP) to Na at 1:1 and weight ratio of montmorillonite to Dow Epoxy Resin (DER 331) at 1:0.75.
Figure 10:
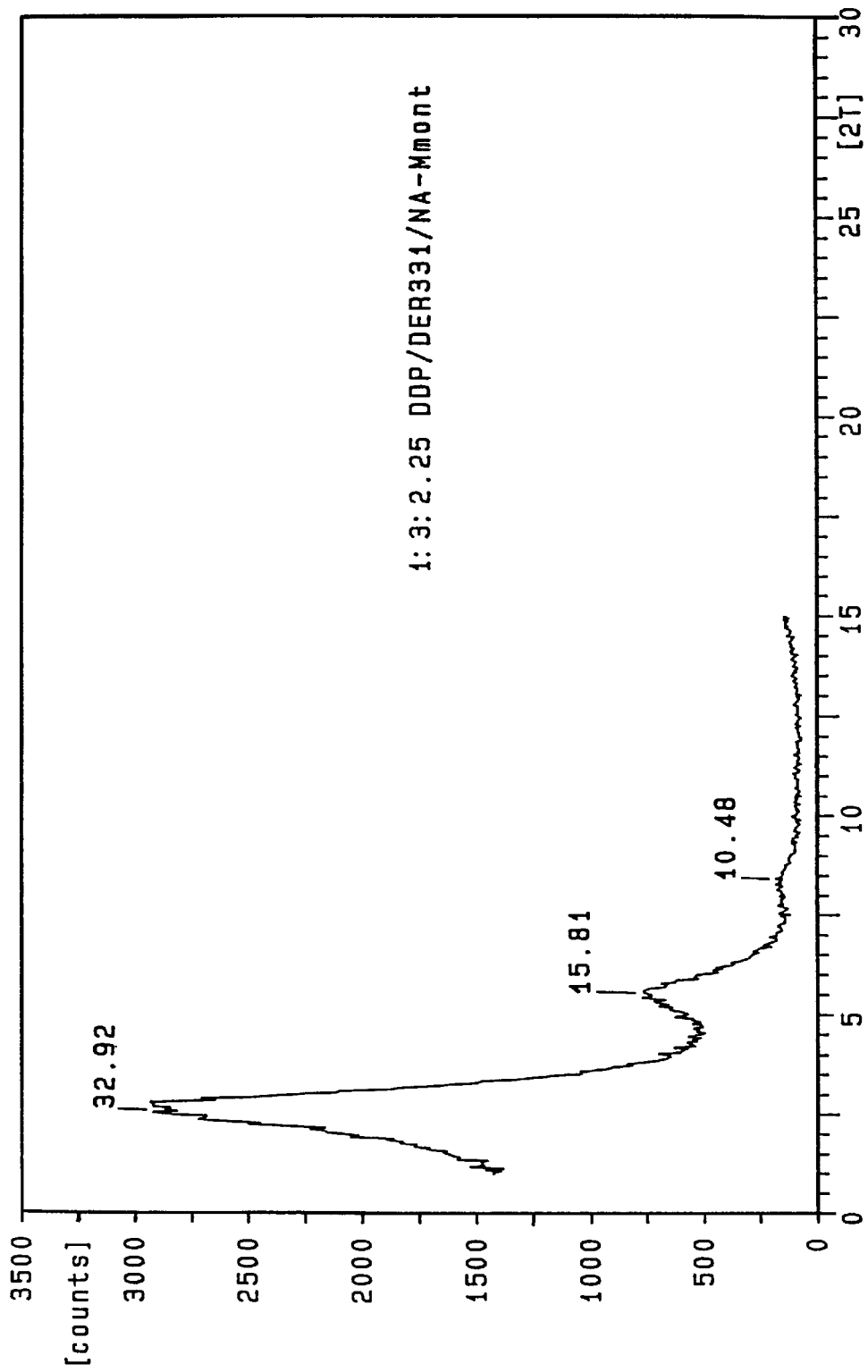
FIG. 10 is an x-ray diffraction (XRD) pattern of the intercalate concentrate (1:3:2.25) with molar ratio of DDP to Na at 1:3 and weight ratio of montmorillonite to DER 331 at 1:0.75.

This example illustrates the formation of a co-intercalate concentrate of DDP/Epoxy/Clay. The co-intercalate can be formed by the following various methods, from dried clay to a clay slurry. For example, 200 grams of dried Na-montmorillonite clay (with about 8 weight percent water and a cation exchange capacity (CEC) of 120 milliequivalents per 100 grams) was mixed with 150 grams of Dow liquid epoxy resin DER 331 at room temperature. 62 grams of DDP (1-dodecyl-2 pyrrolidone), in a 1:1 molar ratio to the Na$^+$ cation in the 200 grams Na-montmorillonite, was added to the epoxy-clay mixture. The mixture was only a physical mixture and in a paste state. Then, 150 grams of water was gradually added to the above mixture. Once the water reached the surface of the DDP/epoxy/clay mixture, the mixture formed a thickened, and solid-like material. The added water molecules promoted the intercalation of the epoxy and DDP molecules which were physically mixed around the clay tactoids. Once the co-intercalation occurred, the free liquid phase of DDP and epoxy disappeared and the mixture turned to a solid-like form. The water-added mixture was extruded by using a single screw extruder and dried at 90–95° C. A uniform powdered material was obtained after drying. The dried material was ground and a powder x-ray diffraction (XRD) analysis was obtained. For reference, the powder XRD pattern of the starting Na-montmorillonite was given in FIG. 8. The Na-montmorillonite had a basal spacing of 12.3 Å. The interlayer spacing was 2.7 Å, which was occupied by Na ions and coordinating water molecules. The XRD of the dried DDP/Epoxy/Clay materials is shown in FIG. 9. The basal spacing of the materials is 34 Å, which indicates the epoxy and DDP have intercalated into the interlayer spacing of the Na-montmorillonite and a co-intercalate was formed. The co-intercalate has a similar structure, as shown in FIGS. 5 and 6, wherein DDP molecules bind to the interlayer Na ions and epoxy molecules reside in the interlayer spacing. The co-intercalate has an epoxy resin content of 37 weight percent. This co-intercalate was designated as 1:1:0.75 DDP/DER 331/Clay co-intercalate concentrate, wherein the first pair number 1:1 indicates the molar ratio of DDP or surface modifier to the interlayer cation; and the second pair number 1:0.75 indicates the weight ratio of clay to epoxy resin. The molar ratio of surface modifier to interlayer cation can be reduced to as low as 1:5. FIG. 10 shows an XRD pattern of 1:3:2.25 DDP/DER 331/Clay co-intercalate concentrate having an epoxy content of 42 weight percent.

The DDP/Epoxy/Clay co-intercalate concentrates were also prepared by adding a desired amount of DDP and epoxy resin into a clay slurry and then drying the mixture. The DDP/Epoxy/Clay co-intercalate concentrates were prepared by using a twin-screw extruder. The premixed DDP/epoxy/water emulsion was added to the clay and extruded to form noodle-like materials and dried. The co-intercalate concentrates with the same chemical compositions prepared by other methods had essentially the same XRD patterns.

EXAMPLE 2

Example 2 is a comparative example to demonstrate the importance of the surface modifier in the formation of the co-intercalated concentrate. 200 grams of dried Na-montmorillonite clay (with about 8 weight percent water and a cation exchange capacity (CEC)=120 milliequivalents/100 grams) was mixed with 150 grams of Dow epoxy resin DER 331. 150 grams of water was added to the epoxy/clay mixture and extruded by using a single-screw extruder. The epoxy/clay mixture became more viscous when water was added. The extruded material was dried at 90–95° C. and a thick paste-like material was obtained. XRD of the paste-like materials displayed an interlayer spacing of 19 Å, which indicated slight intercalation of epoxy molecules into the interlayer spacing of the host clay. The paste-like morphology of the material also indicates that most of the epoxy molecules reside outside the clay interlayer region. Therefore, the presence of surface modifier is critical for the concentrate (intercalate) formation.

EXAMPLE 3

Example 3 further illustrates the formation of a co-intercalate concentrate from a surface modifier, an epoxy resin and clay by using a different surface modifier (Neodol) and by using longer chain 1-octadecyl-2 pyrrolidone. As stated, the surface modifier can be any molecule which has a long ($C_6$+) alkyl chain and a functional group which can bond the clay interlayer cations. Neodol series, 1-3, 1-5, 1-7, and 1-9, linear primary alcohol ethoxylate, is a perfect candidate for the surface modifier. All the Neodol primary alcohol ethoxylates have a $C_{11}$ alkyl chain and different percentages of ethylene oxide units. The ethylene oxide units have a strong affinity to bond to Na$^+$ ions in the clay interlayer spacing.

A particular example is as follows: 100 grams of Na-montmorillonite clay was mixed with 100 grams of DER 354 (a Bisphenol-F type epoxy resin from Dow Chemical) and 36 grams of Neodol 1-3. 100 grams of water then was added to the epoxy/Neodol/clay mixture. The Neodol and epoxy co-intercalated into the clay interlayer spacing. The dried Neodol/DER 354/Clay had a basal spacing of 33.1 Å.

Figure 11:
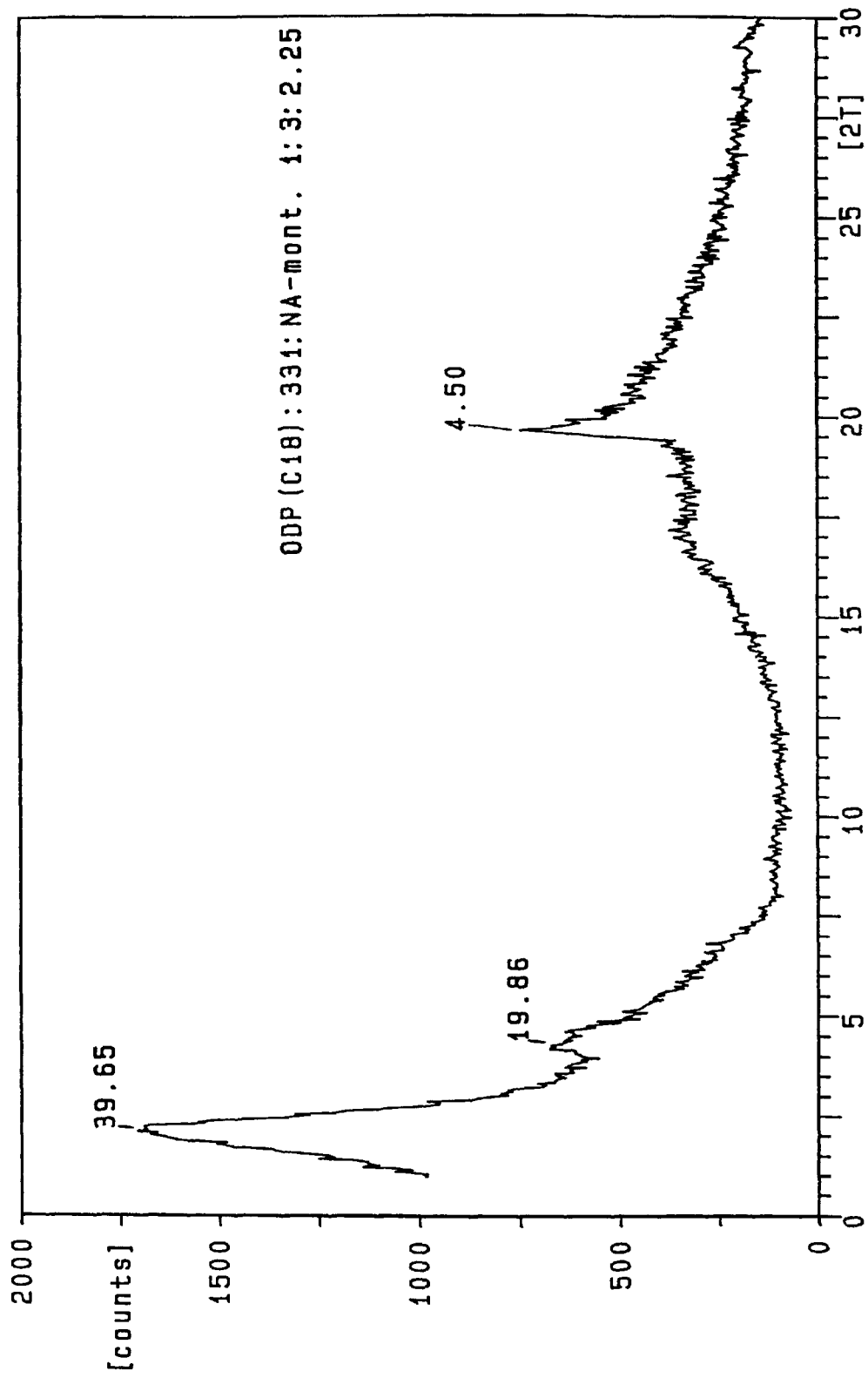
FIG. 11 is an x-ray diffraction (XRD) pattern of the intercalate concentrate (1:3:2.25) with molar ratio of ODP ($C_{18}$) to Na at 1:3 and weight ratio of montmorillonite to DER 331 at 1:0.75.

Another particular example is to use a longer chain pyrrolidone-type surface modifier. 1-octadecyl-2 pyrrolidone was used in this study. 1-octadecyl-2 pyrrolidone is solid at room temperature. 41 grams of 1-octadecyl-2 pyrrolidone, 150 grams of DER 331 and 150 grams of water were mixed and heated to 75° C. to form a uniform emulsion. 200 grams of Na-montmorillonite was added to the emulsion and mixed and extruded. The dried co-intercalate (1:3:2.25-ODP/DER 331/Clay) has a basal spacing of 39.7 Å (FIG. 11), which is a higher basal spacing than the co-intercalate prepared from the shorter chain 1-dodecyl-2 pyrrolidone. This indicates the size of the surface modifier can control the extent of the intercalation of the monomer intercalant.

EXAMPLE 4

Figure 12:
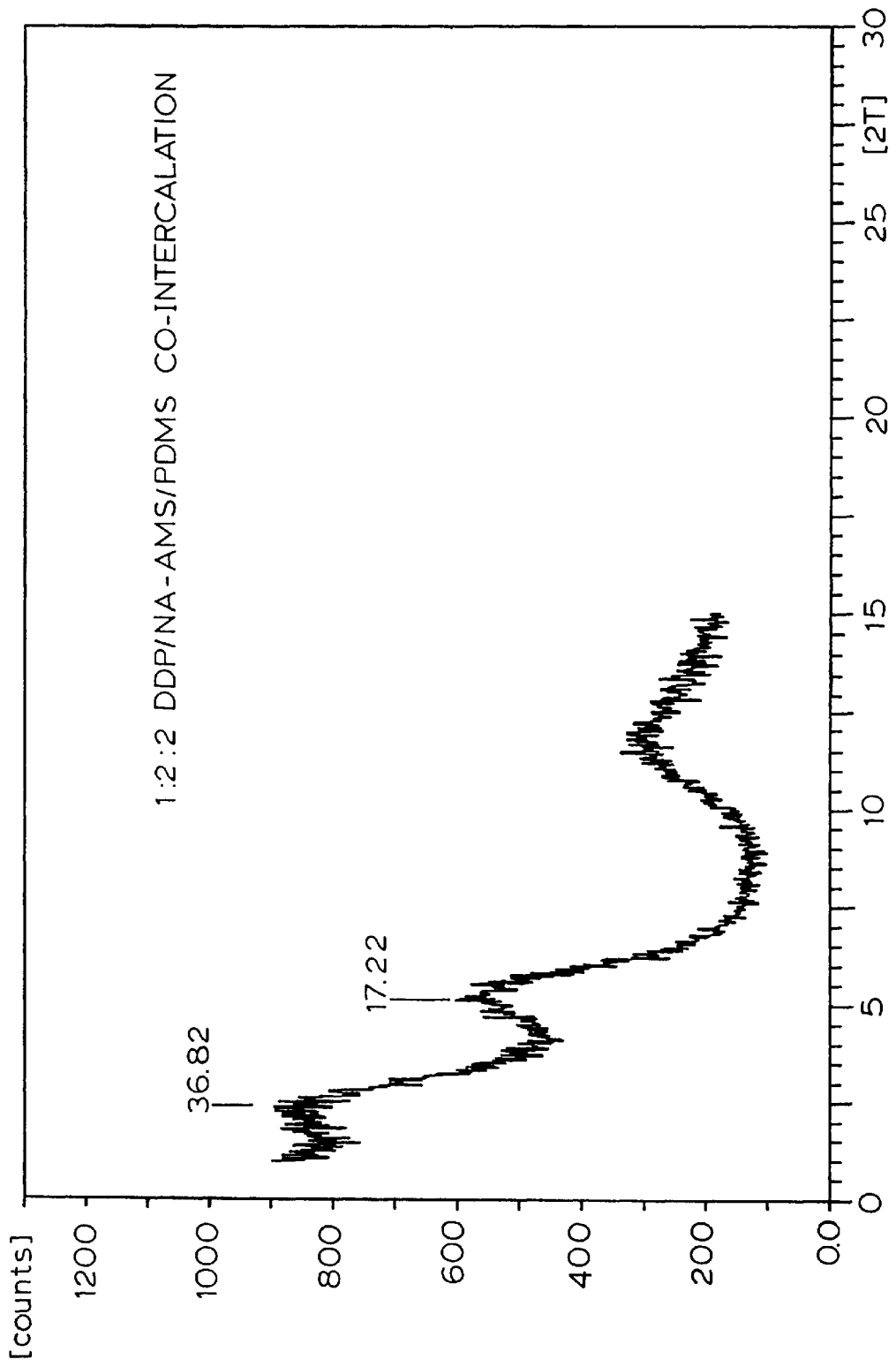
FIG. 12 is an x-ray diffraction (XRD) pattern of the co-intercalate of DDP (dodecylpyrrolidone)/PDMS (polydimethylsiloxane)/Clay concentrate at a DDP to $Na^+$ ion molar ratio of 1:2 and a PDMS to Clay weight ratio of 1:1.

Example 4 demonstrates the formation of a co-intercalate concentrate from a DDP surface modifier with a polymeric intercalant material (polydimethylsiloxane) and clay. 200 grams of PDMS (Gelest DMS-S35) with a molecular weight of 49,000 was mixed with 200 grams of Na-montmorillonite. 31 grams of DDP was added to the mixture followed by the addition of 200 grams of water. The mixture was fully mixed and extruded by using a single extruder and dried at 90–95° C. The dried material has a basal spacing of 36 Å, which indicates the successful co-intercalation of DDP and PDMS into the clay interlayer spacing (FIG. 12).

EXAMPLE 5

Figure 13:
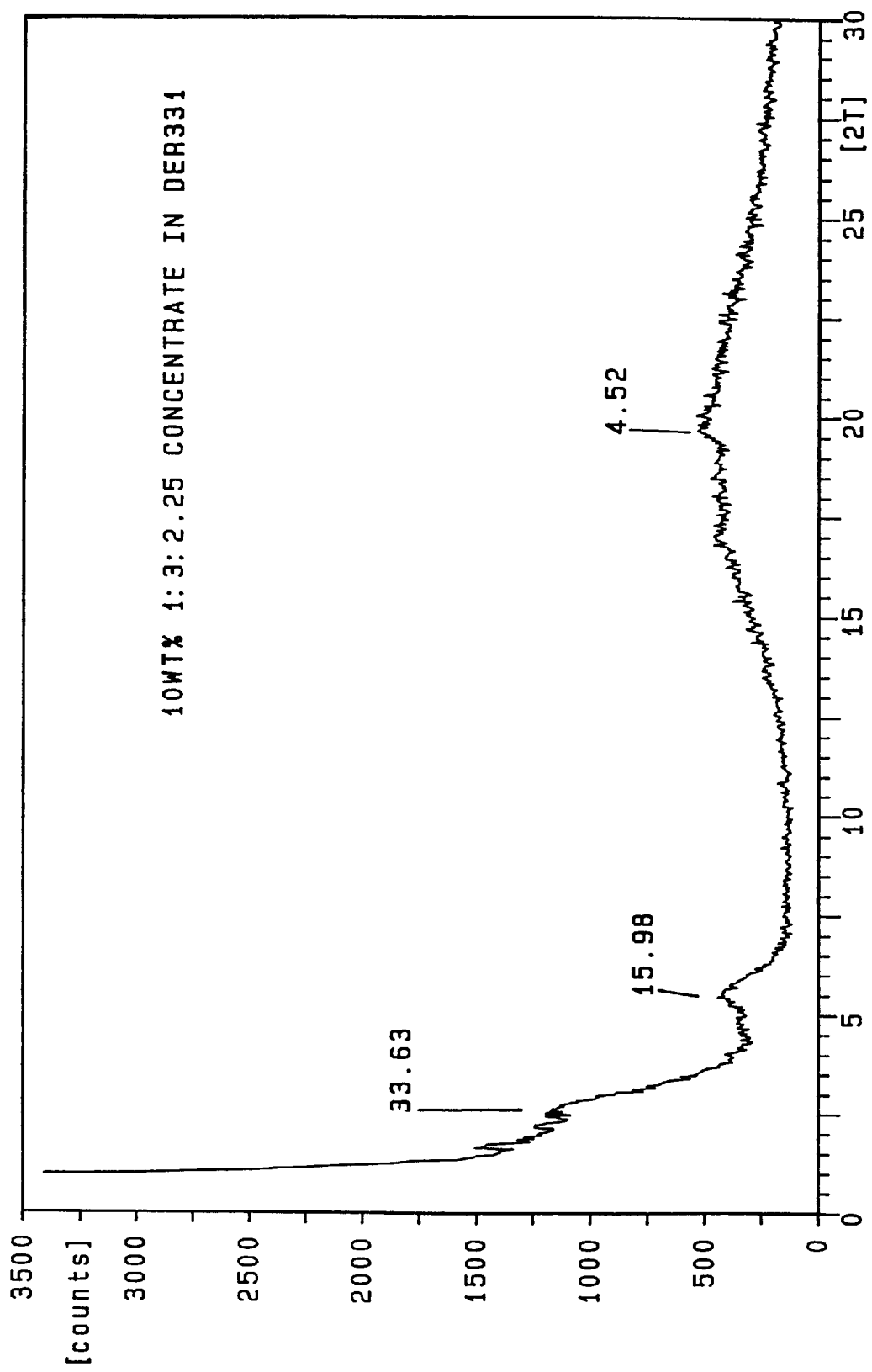
FIG. 13 is an x-ray diffraction (XRD) pattern of an epoxy suspension with 10 weight percent intercalate (1:3:2.25) and 90 weight percent of DER 331.
Figure 14:
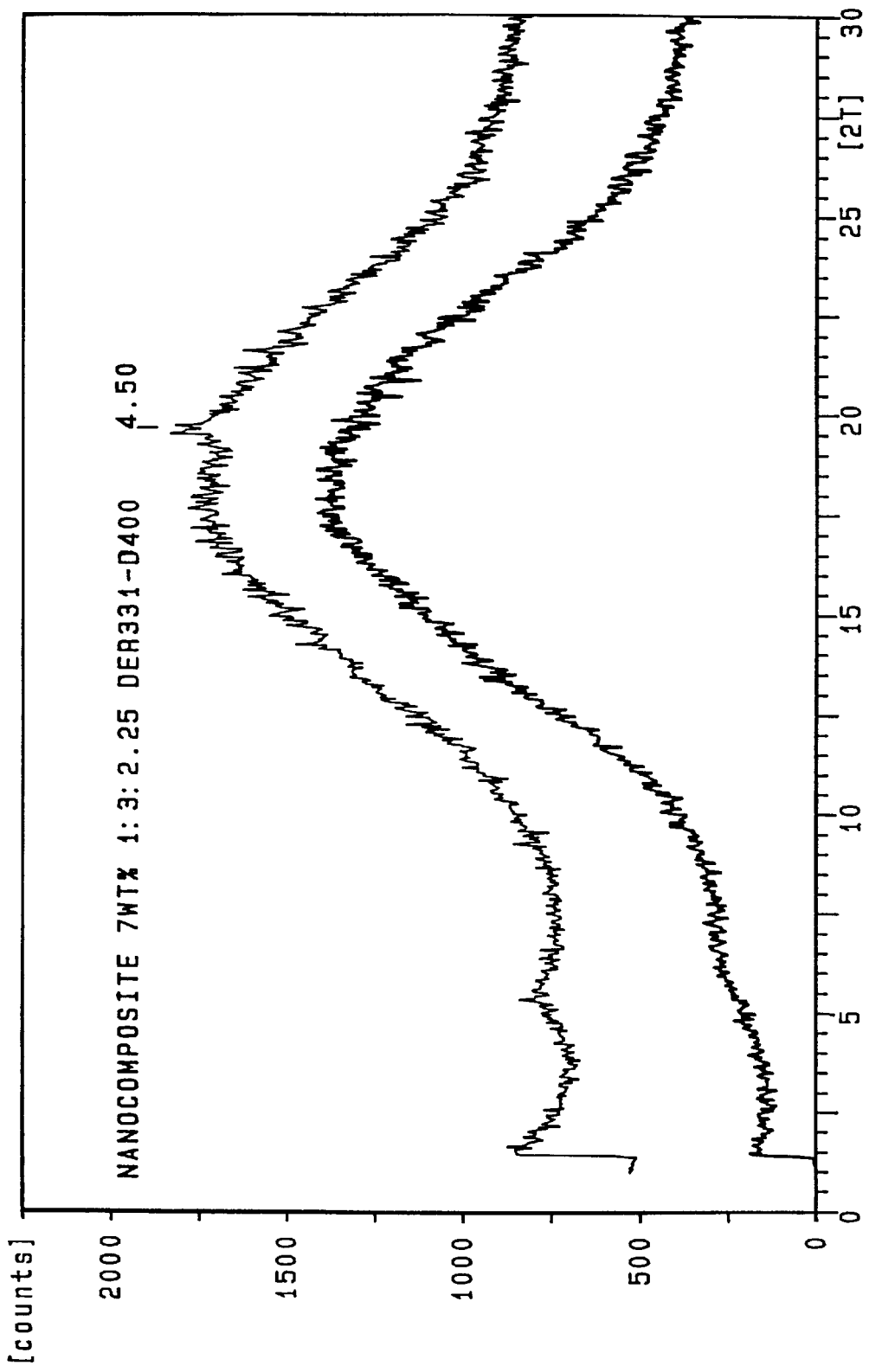
FIG. 14 is an x-ray diffraction (XRD) pattern of the cured epoxy-clay nanocomposite prepared from the epoxy-clay suspension (FIG. 13) and Jeffamine D400 curing agent.

Example 5 shows the formation of exfoliated nanocomposites by using the DDP/Epoxy/Clay co-intercalate concentrate and describes some of the properties of the resulting nanocomposites. The DDP/Epoxy/Clay has an epoxy loading of about 40 weight percent, and its interlayer spacing was filled with epoxy monomers. Therefore, in order to exfoliate the co-intercalate, the concentrate was dispersed into the raw liquid resin. 10 grams of DDP/Epoxy/Clay (1:3:2.25-DDP/DER 331/Clay) was blended with 90 grams of DER 331 resin, as a matrix or host material. The XRD pattern of the dispersed epoxy-concentrate is shown in FIG. 13. It should be noted that the original sharp diffraction peak at 32 Å (FIG. 10) was lowered in its intensity and broadened. This indicates the partial exfoliation of the co-intercalate by mixing with the raw resin. 50 grams of Jeffamine D400 curing agent (Huntsman Chemical) was added to the epoxy-DDP/Epoxy/Clay concentrate dispersion and cured at 75° C. for 3 hours and followed by an additional 3 hours at 125° C. The XRD of the obtained cured epoxy-clay composite is shown in FIG. 14. The XRD pattern displays no indication of clay interlayer ordering in the cured composite, while the 2-D clay structure was retained as evidenced by the doll spacing of 4.5 Å. For comparison, a pristine XRD pattern of pristine DER 331-D400 matrix is shown in the lower curve of FIG. 14.

Figure 15:
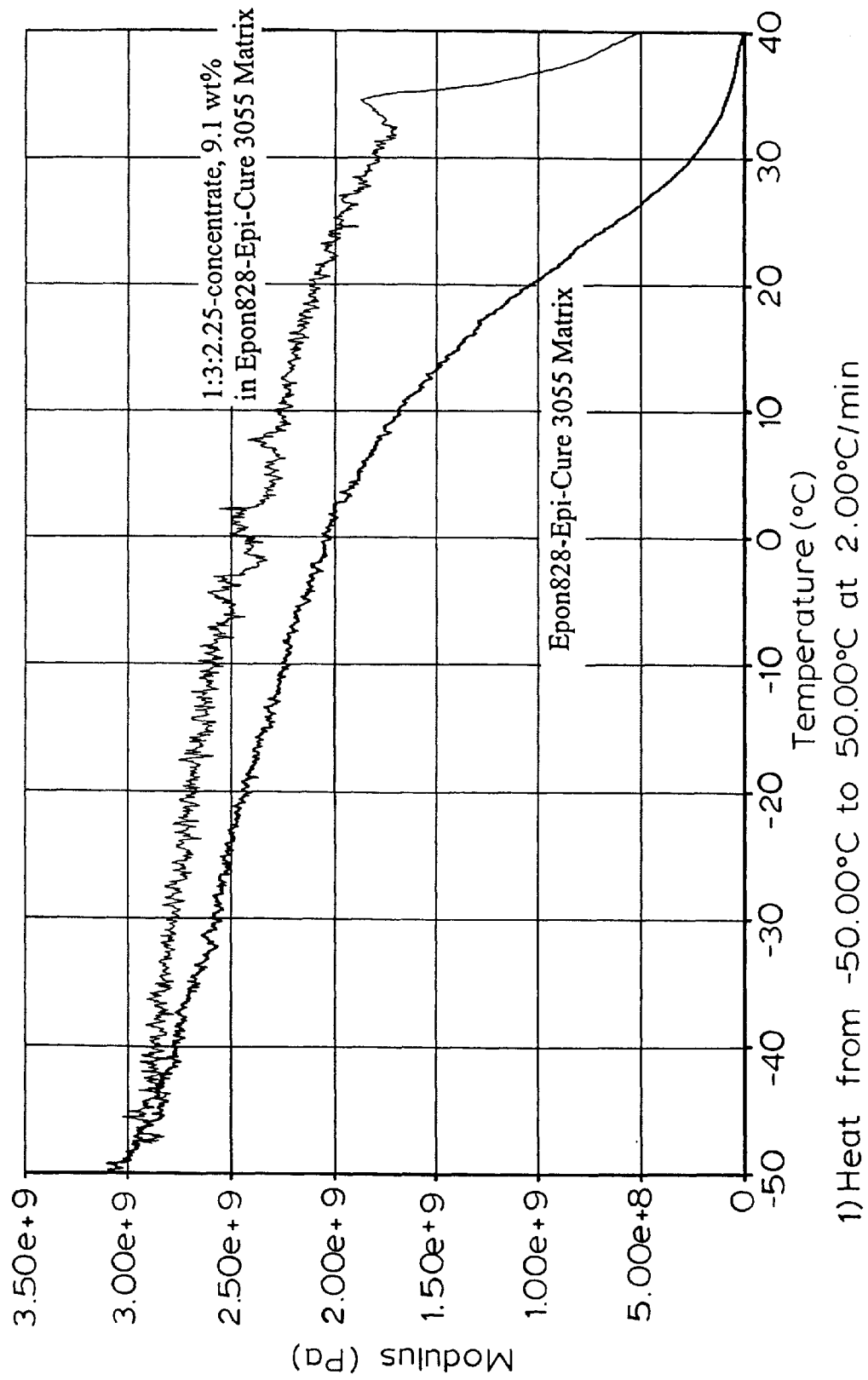
FIG. 15 is a group of DMA (Dynamic Mechanical Analysis) curves of epoxy-clay nanocomppsite. The epoxy matrix is Epon 828 cured with Epi-Cure 3055, and is flexible at room temperature.
Figure 16:
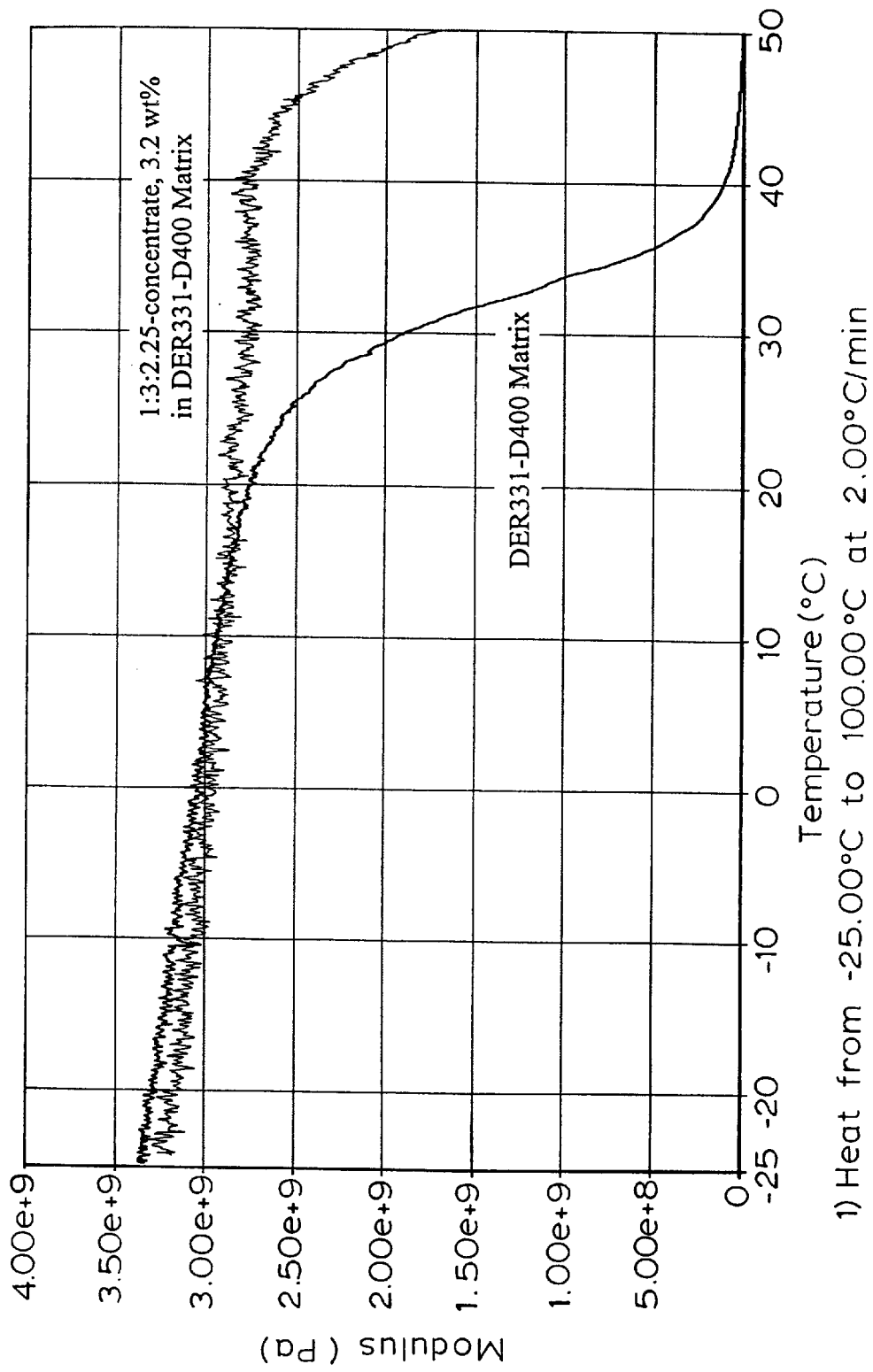
FIG. 16 is a group of DMA (Dynamic Mechanical Analysis) curves of epoxy-clay nanocomposite. The epoxy matrix is DER 331 cured with Jeffamine D400, and is rigid at room temperature.
Figure 17:
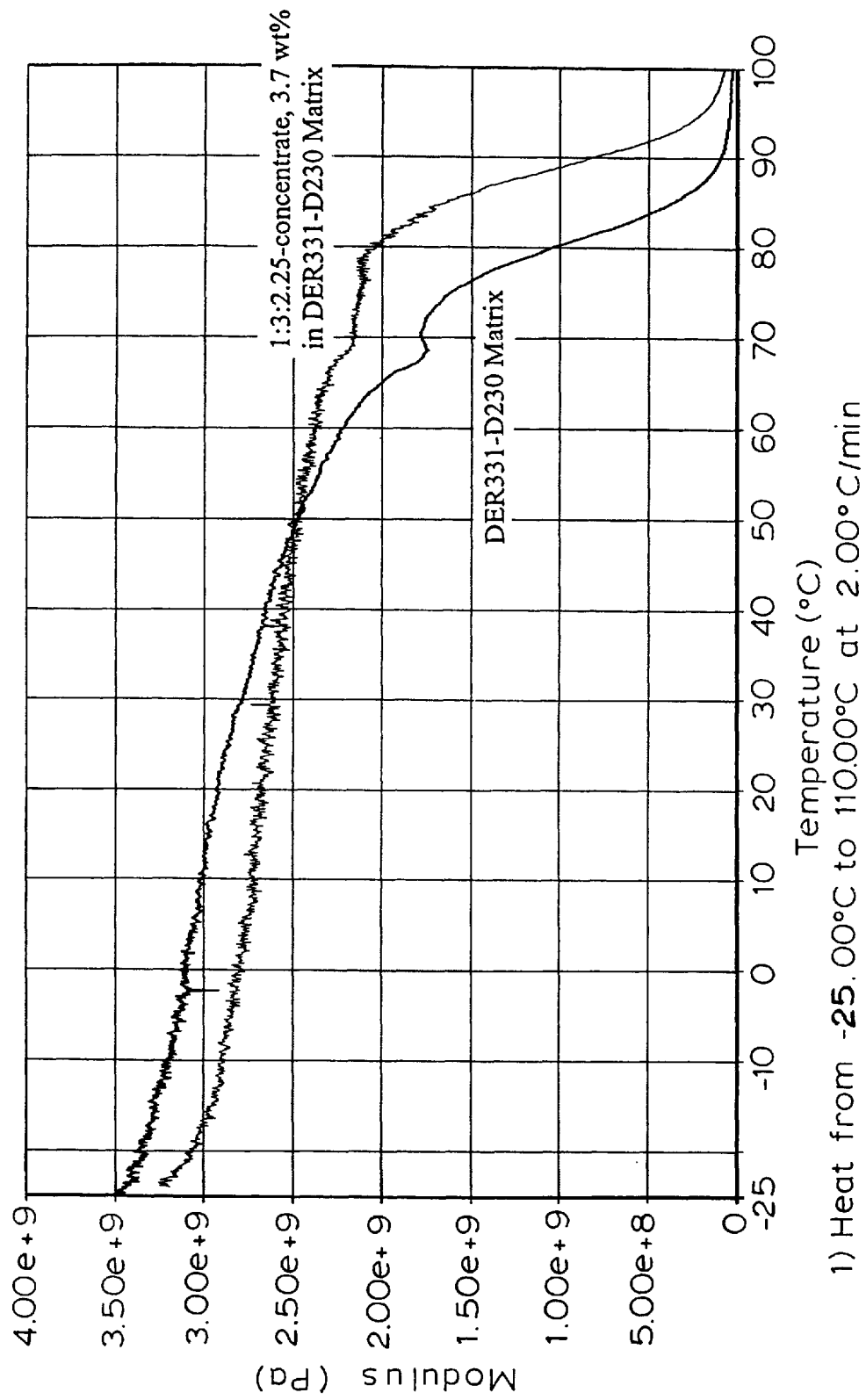
FIG. 17 is a comparison of flexural modulus at room temperature of epoxy-clay nanocomposite preparation by casting and compression molding. The matrix is DER 331 cured by Jeffamine D230.

DDP/DER 331/Clay concentrate was used to prepare an epoxy composite by using Epi-Cure 3055 (Shell Chemical) and Jeffamine D230 (Huntsman Chemical) curing agents. The dynamic mechanical analysis (DMA) curves are shown in FIGS. 15, 16, and 17 for comparison, the DMA curves of the pristine resin matrix were plotted with those of the nanocomposites. It is clearly demonstrated that the nanocomposites have increased modulus and increased glass transition temperatures. The enhanced properties of the nanocomposites will allow more suitable applications for the nanocomposites than for the pristine epoxy matrices.

Figure 18:
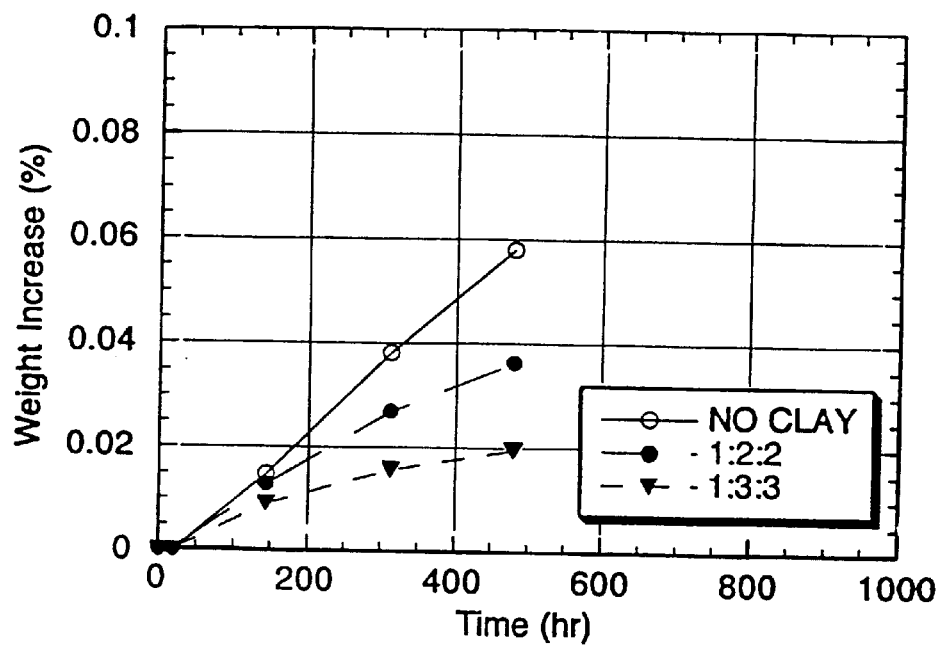
FIGS. 18A and 18B is a comparison of chemical resistance of the epoxy-clay nanocomposite towards toluene and HCl (6N).
Figure 18:
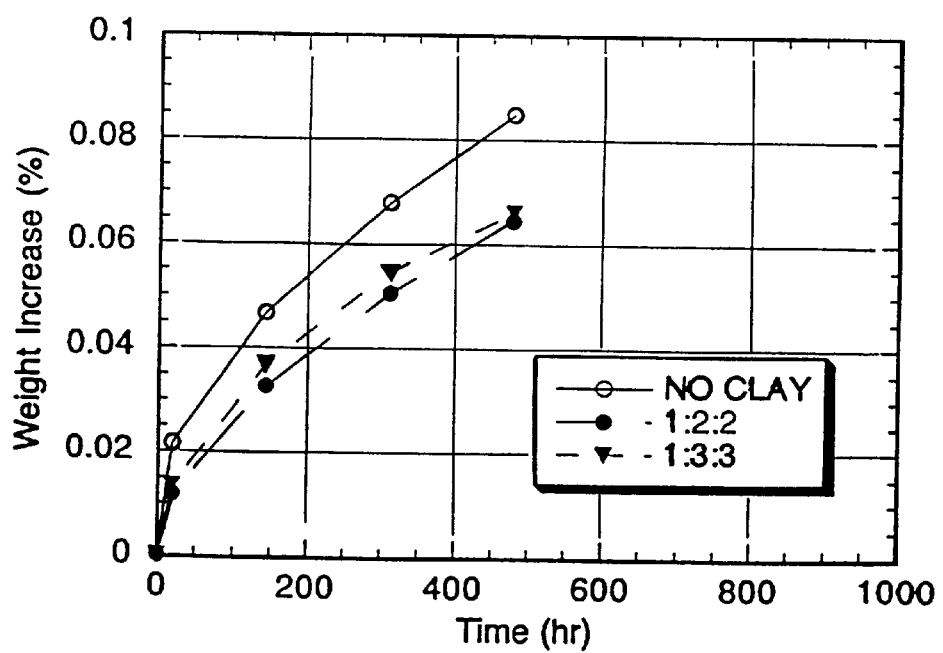

Organic solvent and chemical resistance of the nanocomposites prepared from the concentrated DER 331-D230 matrix with the DDP/DER 331/Clay (1:2:2 and 1:3:3) was evaluated by noting the weight increase through the contact of the nanocomposite samples with toluene and HCl (6M). The weight increase of the was plotted with contact time in FIGS. 18A and 18B. It is clear that the nanocomposites have lower solvent up-take and better HCl resistance.

What is claimed is:

1. An intercalate, capable of being exfoliated, formed by contacting a layered material, with an intercalating composition comprising an intercalant monomer surface modifier including an alkyl radical having at least 6 carbon atoms, said intercalate having a molar ratio of intercalant surface modifier to interlayer cations of at least about 1:5, to achieve sorption and complexing of the intercalant surface modifier between adjacent spaced layers of the layered material to expand the spacing between a predominance of the adjacent platelets of said layered material at least about 10 Å, when measured after sorption of intercalant surface modifier.

2. An intercalate in accordance with claim 1, wherein the concentration of intetcalant surface modifier in said intercalating composition is at least about 0.1% by weight, based on the weight of water, organic solvent for the surface modifier, and intercalant surface modifier in the intercalating composition.

3. An intercalate in accordance with claim 2, wherein the intercalating composition includes a second intercalant selected from the group consisting of a polymerizable monomer, a polymerizable oligomer a polymer, and a mixture thereof, wherein the concentration of said second intercalant in said intercalating composition is at least about 1% by weight.

4. An intercalate in accordance with claim 3, wherein the concentration of the second intercalant in said intercalating composition is at least about 2% by weight.

5. An intercalate in accordance with claim 4, wherein the concentration of the second intercalant in said intercalating composition is at least about 30% by weight.

6. An intercalate in accordance with claim 4, wherein the concentration of the second intercalant in said intercalating composition in the range of about 10% to about 60% by weight.

7. An intercalate in accordance with claim 5, wherein the concentration of the second intercalant in said intercalating composition in the range of about 50% to about 90% by weight.

8. An intercalate in accordance with claim 3, wherein the concentration of the second intercalant in the intercalating composition is at least about 10% by weight, based on the dry weight of the layered material contacted.

9. An intercalate in accordance with claim 8, wherein the concentration of the second intercalant in the intercalating composition is in the range of about 16% to about 70% by weight, based on the dry weight of the layered material contacted.

10. An intercalate in accordance with claim 9, wherein the concentration of the second intercalant in the intercalating composition is in the range of about 16% to less than about 35% by weight, based on the dry weight of the layered material contacted.

11. An intercalate in accordance with claim 9, wherein the concentration of the second intercalant in the intercalating composition is in the range of about 35% to less than about 55% by weight, based on the dry weight of the layered material contacted.

12. An intercalate in accordance with claim 8, wherein the concentration of the second intercalant in the intercalating composition is in the range of about 55% to less than about 200% by weight, based on the dry weight of the layered material contacted.

13. A method of exfoliating a phyllosilicate comprising:
contacting the phyllosilicate with an intercalating composition comprising at least about 2% by weight of an intercalant surface modifier including an alkyl radical having at least 6 carbon atoms, to achieve intercalation of said surface modifier between said adjacent phyllosilicate platelets in an amount sufficient to space said adjacent phyllosilicate platelets a distance of at least about 10 Å; and
separating the platelets of the intercalated phyllosilicate.

14. The method of claim 13, wherein said intercalating composition includes a water carrier comprising about 5% to about 50% by weight water, based on the total weight of said intercalating composition.

15. The method of claim 14, wherein said intercalating composition comprises about 10% to about 40% by weight water.

16. The method of claim 13, wherein the intercalating composition further includes a second intercalant selected from the group consisting of a polymerizable monomer, a polymerizable oligomer, a polymer, and a mixture thereof, wherein the concentration of said second intercalant in said intercalating composition is at least about 1% by weight.

17. The method of claim 16, wherein the second intercalant is included in an intercalating composition in a concentration of about 10–90% by weight, based on the total weight of the intercalating composition.

18. A composition comprising an organic liquid carrier in an amount of about 40% to about 99.95% by weight, and about 0.05% to about 60% by weight of an intercalated phyllosilicate material, said intercalated phyllosilicate material formed by contacting a phyllosilicate with an intercalant surface modifier including an alkyl radical having at least 6 carbon atoms, to form an intercalating composition, having a weight ratio of intercalant surface modifier:phyllosilicate of at least about 1:5 to achieve sorption of the intercalant surface modifier between adjacent spaced layers of the phyllosilicate to expand the spacing between a predominance of the adjacent phyllosilicate platelets at least about 10 Å, when measured after sorption of the intercalant surface modifier, based on the dry weight of the phyllosilicate.

19. The composition of claim 18, wherein the intercalate is exfoliated into a predominance of individual platelets.

20. A composition in accordance with claim 18, wherein said intercalating composition further includes a second intercalant selected from the group consisting of a polymerizable monomer, a polymerizable oligomer, a polymer and a mixture thereof, wherein the concentration of said intercalant surface modifier in said intercalating composition is at least about 1% by weight, and wherein the concentration of the second intercalant in said intercalating composition is at least about 4% by weight, based on the dry weight of the phyllosilicate in the intercalating composition.

21. A composition in accordance with claim 20, wherein the concentration of the second intercalant in said intercalating composition is at least about 15% by weight, based on the dry weight of the phyllosilicate in the intercalating composition.

22. A composition in accordance with claim 21, wherein the concentration of the second intercalant in said intercalating composition is at least about 20% by weight.

23. A composition in accordance with claim 22, wherein the concentration of the second intercalant in said intercalating composition is at least about 30% by weight based on the dry weight of the phyllosilicate in the intercalating composition.

24. A composition in accordance with claim 23, wherein the concentration of the second intercalant in said intercalating composition in the range of about 50% to about 80% by weight.

25. A composition in accordance with claim 23, wherein the concentration of the second intercalant in said intercalating composition in the range of about 50% to about 200% by weight based on the dry weight of the phyllosilicate in the intercalating composition, and wherein the second intercalant does not include an onium ion or a silane coupling agent.

26. A composition in accordance with claim 21, wherein the concentration of the second intercalant in the intercalating composition is at least about 16% by weight.

27. A composition in accordance with claim 26, wherein the concentration of the second intercalant in the intercalating composition is in the range of about 16% to about 200% by weight.

28. A composition in accordance with claim 27, wherein the concentration of the second intercalant in the intercalating composition is in the range of about 16% to less than about 35% by weight.

29. A composition in accordance with claim 27, wherein the concentration of the second intercalant in the intercalating composition is in the range of about 35% to less than about 55% by weight.

30. A composition in accordance with claim 27, wherein the concentration of the second intercalant in the intercalating composition is in the range of about 55% to less than about 70% by weight.

31. A composition in accordance with claim 18, further including a matrix polymer selected from the group consisting of an epoxy; polyamide; polyvinyl alcohol; polycarbonate; polyvinylimine; polyvinylpyrrolidone; polyethylene terephthalate; polybutylene terephthalate; a polymer polymerized from a monomer selected from the group consisting of dihydroxyethyl terephthalate; dihydroxybutyl terephthalate; hydroxyethylmethyl terephthalate; hydroxybutylmethyl terephthalate; and mixtures thereof.

32. A composition in accordance with claim 31, wherein the matrix polymer is a mixture of a polymer of hydroxyethyl terephthalate with a polymer polymerized from a monomer selected from the group consisting of dihydroxyethyl terephthalate and dihydroxybutyl terephthalate, and mixtures thereof.

33. A composition in accordance with claim 31, wherein the matrix polymer is polyethylene terephthalate.

34. A method of manufacturing a composite material containing about 10% to about 99.95% by weight of a matrix polymer selected from the group consisting of a thermoplastic polymer, a thermosetting polymer, and mixtures thereof, and about 0.05% to about 60% by weight of exfoliated platelets of a phyllosilicate material, said platelets derived from an intercalated phyllosilicate having an intercalant surface modifier having an alkyl radical of at least 6 carbon atoms intercalated between and bonded to an inner surface of the phyllosilicate platelets through a bonding mechanism selected from the group consisting of ionic complexing; electrostatic complexing; chelation; hydrogen bonding; ion-dipole; dipole/dipole; Van Der Waals forces; and any combination thereof, comprising:

contacting the phyllosilicate with an intercalating composition comprising water and said intercalant surface modifier, said intercalant surface modifier including an alkyl radical having at least 6 carbon atoms, to achieve intercalation of said intercalant surface modifier between said adjacent phyllosilicate platelets in an amount sufficient to space said adjacent phyllosilicate platelets a distance of at least about 10 Å;

combining the intercalate with said matrix polymer;

exfoliating the spaced platelets of said intercalate into predominantly individual platelets; and dispersing said exfoliated platelets throughout said matrix polymer.

35. The method of claim 34, wherein said intercalating composition includes said water, said intercalant surface modifier, said phyllosilicate, and a second intercalant selected from the group consisting of a polymerizable monomer, a polymerizable oligomer, a hydrophobic polymer, and a mixture thereof, wherein the concentration of said second intercalant in said intercalating composition is at least about 1% by weight.

36. The method of claim 34, wherein said intercalating composition comprises about 10% to about 90% by weight of said second intercalant, based on the dry weight of the phyllosilicate.

37. A composite material comprising a matrix polymer in an amount of about 40% to about 99.95% by weight of the composite material, and about 0.05% to about 60% by weight exfoliated platelets of a phyllosilicate material, said platelets derived from an intercalate formed by contacting a phyllosilicate with an intercalating composition containing an intercalant surface modifier, said intercalant surface modifier including an alkyl radical having at least 6 carbon atoms, without a coupling agent selected from the group consisting of onium ion and silane coupling agents, said intercalating composition having a concentration of said intercalant surface modifier of at least about 2% by weight, and a second intercalant selected from the group consisting of a polymerizable monomer, a polymerizable oligomer, a polymer, and a mixture thereof, wherein the concentration of said second intercalant in said intercalating composition is at least about 1% by weight, said second intercalant included in the intercalating composition in a quantity sufficient to incorporate multiple layers of said second intercalant between adjacent phyllosilicate platelets, and to achieve sorption of the intercalant surface modifier having alkyl radicals extending perpendicular to the phyllosilicate platelets to expand the spacing between a predominance of the adjacent phyllosilicate platelets at least about 10 Å, when measured after sorption of the said intercalant.

38. A composite material in accordance with claim 37, wherein the quantity of the second intercalant in said intercalating composition is about 16% to about 80% by weight, based on the weight of phyllosilicate contacted by said intercalating composition.

39. A method of manufacturing a composite material containing about 40% to about 99.95% by weight of a matrix thermoplastic or thermosetting polymer, and about 0.05% to about 60% by weight of exfoliated platelets of a phyllosilicate material, said platelets derived from an intercalated phyllosilicate having an intercalant monomer surface modifier intercalated between adjacent phyllosilicate platelets comprising:

contacting the phyllosilicate with an intercalating composition including an intercalant monomer surface modifier having an alkyl radical of at least 6 carbon atoms, without first contacting the phyllosilicate with a coupling agent selected from the group consisting of onium ion and silane coupling agents, comprising at least about 5% by weight of said intercalant monomer surface modifier, and a second intercalant selected from the group consisting of a polymerizable monomer, a polymerizable oligomer, a polymer, and a mixture thereof, concentration of second intercalant monomer in said intercalating composition of at least about 1% by weight in a quantity sufficient to incorporate multiple layers of said second intercalant between adjacent phyllosilicate platelets for exfoliation of said platelets, to achieve intercalation of said intercalant monomer surface modifier and said second intercalant between said adjacent phyllosilicate platelets in an amount sufficient to space said adjacent phyllosilicate platelets a distance of at least about 10 Å;

combining the intercalated platelets with said thermoplastic or thermosetting polymer, and heating the thermoplastic polymer sufficiently to provide for flow of said thermoplastic polymer and delamination of the platelets of said phyllosilicate; and dispersing said delaminated platelets throughout said matrix polymer.

40. A method in accordance with claim 39, wherein the intercalating composition includes about 16% to about 80% by weight of said second intercalant, based on the weight of phyllosilicate contacted by said intercalating composition.

41. An intercalate in accordance with claim 1, wherein the amount of intercalant monomer surface modifier intercalated into the phyllosilicate material is 10–90% monomer based on the dry weight of the phyllosilicate material.

42. An intercalate in accordance with claim 41, wherein the amount of intercalant monomer surface modifier intercalated into the phyllosilicate material is about 15% to about 80%, based on the dry weight of the phyllosilicate material.

43. An intercalate in accordance with claim 42, wherein the molar ratio of intercalated monomer surface modifier to interlayer phyllosilicate cations is from about 1:1 to 1:5.

44. An intercalate in accordance with claim 43, wherein the weight ratio of the second intercalant to phyllosilicate material is from about 20 grams of second intercalant per 100 grams of phyllosilicate material to about 80 grams of second intercalant per 100 grams of phyllosilicate material.

45. An intercalate in accordance with claim 1, wherein the weight ratio of intercalant monomer surface modifier to phyllosilicate material in the intercalating composition is in the range of 1:1 to 1:5.

46. A method in accordance with claim 13, wherein the amount of intercalant monomer surface modifier intercalated into the phyllosilicate material is 10–90% intercalant monomer surface modifier, based on the dry weight of the phyllosilicate material.

47. A method in accordance with claim 46, wherein the amount of intercalant monomer surface modifier intercalated into the phyllosilicate material is about 15% to about 80%, based on the dry weight of the phyllosilicate material.

* * * * *